United States Patent
Arnold et al.

(10) Patent No.: US 11,079,729 B2
(45) Date of Patent: *Aug. 3, 2021

(54) METHOD FOR CONTROLLING A MULTIVALENT ENERGY SUPPLY INSTALLATION

(71) Applicant: Viessmann Werke GmbH & Co. KG, Allendorf (DE)

(72) Inventors: Christian Arnold, Neuhof-Rommerz (DE); Martin Bock, Frankenau (DE); Andrej Grad, Bromskirchen (DE); Tobias Maurer, Allendorf (DE); Reinhard Osterloh, Winterberg (DE); Jörg Timmermann, Battenberg (DE)

(73) Assignee: Viessmann Werke GmbH & Co. KG, Allendorf (DE)

( * ) Notice: Subject to any disclaimer, the term of this patent is extended or adjusted under 35 U.S.C. 154(b) by 276 days.

This patent is subject to a terminal disclaimer.

(21) Appl. No.: 16/087,659

(22) PCT Filed: Mar. 23, 2017

(86) PCT No.: PCT/EP2017/056929
§ 371 (c)(1),
(2) Date: Sep. 23, 2018

(87) PCT Pub. No.: WO2017/162795
PCT Pub. Date: Sep. 28, 2017

(65) Prior Publication Data
US 2020/0301381 A1    Sep. 24, 2020

(30) Foreign Application Priority Data
Mar. 24, 2016    (DE) .......................... 102016205030.3

(51) Int. Cl.
*G05B 19/042*    (2006.01)

(52) U.S. Cl.
CPC .... *G05B 19/042* (2013.01); *G05B 2219/2639* (2013.01)

(58) Field of Classification Search
CPC .......... G05B 19/042; G05B 2219/2639; F24F 11/30; F24F 11/46
See application file for complete search history.

(56) References Cited

U.S. PATENT DOCUMENTS

| | | | |
|---|---|---|---|
| 9,638,435 B2* | 5/2017 | Ambriz | F24F 11/30 |
| 2003/0213246 A1* | 11/2003 | Coll | F01K 17/02 |
| | | | 60/653 |

(Continued)

FOREIGN PATENT DOCUMENTS

| | | |
|---|---|---|
| AT | 383432 B | 7/1987 |
| DE | 2856018 A1 | 7/1980 |

(Continued)

OTHER PUBLICATIONS

International Search Report dated May 29, 2017 for PCT App. Ser. No. PCT/EP2017/056929.

*Primary Examiner* — Thomas C Lee
*Assistant Examiner* — Ameir Myers
(74) *Attorney, Agent, or Firm* — Henricks Slavin LLP

(57) ABSTRACT

A method is provided for controlling a multivalent energy supply system including at least two energy generators using at least two different energy carriers to provide heat, cold, and/or electrical energy. For each generator, a closed-loop controller controls variables of the generator. Each generator assumes one of three possible switching states: the generator must be switched on, must be switched off, or may be switched on or off. The system includes a control device for coordinatedly controlling the closed-loop controllers. The control device detects at least one request for heat and/or cold and/or electrical energy and determines whether a specific criterion is present which specifies exactly one of (Continued)

the three possible switching states for each generator. The control device determines target values for meeting the request depending on the request and the specific criterion and outputs the target values to the closed-loop controllers.

8 Claims, 8 Drawing Sheets

(56) References Cited

U.S. PATENT DOCUMENTS

| | | |
|---|---|---|
| 2005/0096872 A1 | 5/2005 | Blevens et al. |
| 2007/0038321 A1 | 2/2007 | McDonald et al. |
| 2007/0233286 A1 | 10/2007 | Ishikawa et al. |
| 2008/0082247 A1* | 4/2008 | Hawkins ................ B60L 15/38 |
| | | 701/101 |
| 2009/0018673 A1* | 1/2009 | Dushane ............... G05B 19/042 |
| | | 700/9 |
| 2011/0012427 A1 | 1/2011 | Craig et al. |
| 2011/0071690 A1 | 3/2011 | Sun et al. |
| 2013/0140885 A1 | 6/2013 | Craig et al. |
| 2013/0345880 A1* | 12/2013 | Asmus ............... G05D 23/1917 |
| | | 700/276 |
| 2017/0031962 A1* | 2/2017 | Turney ................... G05B 15/02 |

FOREIGN PATENT DOCUMENTS

| | | |
|---|---|---|
| DE | 10348563 A1 | 5/2004 |
| DE | 202006001553 U1 | 8/2006 |
| DE | 102008063954 B3 | 7/2010 |
| EP | 1202425 A2 | 5/2002 |
| EP | 2144130 A1 | 1/2010 |
| EP | 2187136 A2 | 5/2010 |
| WO | WO 2008/091970 A2 | 7/2008 |
| WO | WO 2009/141176 A1 | 11/2009 |

* cited by examiner

METHOD FOR CONTROLLING A MULTIVALENT ENERGY SUPPLY INSTALLATION

The present invention relates to a method of controlling a multivalent energy supply system comprising at least two energy generators which use ate least two different energy carriers to provide energy in form of heat and/or cold and/or electrical energy. The invention further relates to a control device for controlling a multivalent energy supply system.

A method of operating a system comprising a plurality of heat generating means is known, for example, from EP 2187136 A2. The system may provide heat power using a plurality of heat generating means, wherein the allocation of the heat power to the individual heat generating means is variable so that they can be operated close to their optimal efficiency. The allocation of power may not only be performed by means of a higher-level boiler management system, but also be carried out by coordinating the individual heat generating means with each other.

From the International Patent Application WO 2009/141176 A1, a mobile heating system is known which comprises a plurality of fuel-operated heating devices which are in communication with each other via a bus system. The heating system is configured such that, when starting the heating system, one of the heating devices is configured based on predetermined rules as a master with respect to the control of other heating devices connected to the bus system. The remaining heating devices are configured as slaves.

The European Patent Application EP 2144130 A1 discloses a group management system that can control a plurality of devices collectively and allows flexibly adding or changing device groups.

A hybrid heating system comprising at least one condensing boiler and at least one non-condensing boiler is known from the International Patent Application WO 2008/091970 A2. Switching on or off the individual boilers is carried out by a control after determining the heat load, inter alia, based on the flow in the main line of the heating system as well as other starting criteria. The selection of the boilers is carried out based on the ambient temperature and the operating hours of the individual boilers.

The object of the present invention is to specify a method of controlling a multivalent energy supply system which can provide an improved utilization of currently available energy resources compared to the prior art. In particular, a method of controlling a multivalent energy supply system is to be provided which takes into account generator-specific criteria which may result, for example, from the use of different energy carriers. By taking into account generator-specific criteria, it can also be ensured that the useful life of the energy generators is distributed particularly uniformly, whereby a smooth operation and a long life of the energy generators are made possible. Furthermore, a particularly safe operation of the energy supply system can be achieved.

It is also an object of the present invention to specify a method of controlling a multivalent energy supply system which can provide an improved quality of control compared to the prior art. The quality of control describes the behavior of a control. Here, a high (or good) quality of control means that a certain required target value can be achieved in a particularly short time. A low (or poor) quality of control means that a certain required target value will only be reached in a relatively long time. The present invention thus aims at improving the control of a multivalent energy supply system in such a way that the time to reach a certain predetermined target value or to meet an energy supply request is particularly low.

In conventional control methods for a plurality of energy generators of an energy supply system, the individual energy generators are sequentially switched on or off along a predetermined order. Switching on the next energy generator in the order always takes place only when the current energy demand can no longer be met by the already switched on energy generators. Accordingly, energy generators are switched off when the amount of energy provided exceeds the demand requested. Here, it can occur that an energy generator which can be switched on or off and/or controlled only very slowly blocks the switch-on operation of a subsequent energy generator in the order, so that a very long time may be necessary to meet a demand.

In a further known control method for a plurality of energy generators of an energy supply system, the individual energy generators are switched on and/or off and controlled independently of one another (in parallel). The control is thus completely uncoordinated. Restrictions or specific characteristics of individual energy generators cannot be taken into account in the control of the energy supply system.

The control method according to the invention aims at combining the advantages of a sequential control with those of a parallel control of energy generators. For this purpose, the energy generators are classified into groups, wherein a variable order of the energy generators is set within a group. Furthermore, an order of groups called a cascade may be defined, with a cascade comprising one or more groups.

Thus, a cascade is a level of classification of the energy generators superordinate to groups and defines a sequential order of the energy generators contained therein, respectively. Cascades are independently controllable. Thus, multiple sequential orders of energy generators executable in parallel may be defined, for each of which different criteria for switching on and/or off can be set.

Individual cascades may be controlled in parallel. This ensures that a plurality of sequences controllable in parallel to each other can be defined. As a result, the control of a multivalent energy supply system may respond particularly well to changing conditions. Furthermore, different specific characteristics of the energy generators may be combined with each other particularly well and switching on and/or off the energy generators may be coordinated particularly well.

The object is achieved by specifying a method of controlling a multivalent energy supply system, wherein the multivalent energy supply system comprises at least two energy generators which use at least two different energy carriers to provide energy in the form of heat and/or cold and/or electrical energy. Each energy generator comprises a closed-loop controller for controlling controlled variables of the energy generator. According to the invention, a control device detects at least one energy supply request for at least one energy form of heat and/or cold and/or electrical energy.

Each of the energy generators can assume three possible switching states. Either the energy generator has to be switched on or the energy generator has to be switched off or the energy generator may be switched on or off. If an energy generator is in the first of the three listed switching states, it must not be switched off. If an energy generator is in the second of the three listed switching states, it must not be switched on. These two switching states can prevent frequent energy generators from being frequently switched on an off. In the third of the three listed switching states, the control device can decide whether the energy generator should be switched on or off.

For each of the energy generators, the control device determines if there is an energy generator specific criterion, wherein the result of the determination comprises exactly one of the three possible switching states.

In addition, energy generator specific criteria may exist which specify, for example, minimum and maximum target value limits for the operation of the energy generator.

For each of the plurality of energy generators, the control device determines target values based on the at least one energy supply request and the energy generator specific criteria and outputs the target values to the closed-loop controllers. When determining the target values, the control device thus takes into account whether the energy generators may be switched on or off. For example, the control device may be configured to check whether an energy supply request can be met by energy generators that currently must be switched on. If additional energy generators are required to meet the energy supply request, only those energy generators that do not need to be switched off may be switched on.

The object is also achieved by providing a control device for controlling a multivalent energy supply system, wherein the multivalent energy supply system comprises at least two energy generators which use at least two different energy carriers to provide energy in the form of heat and/or cold and/or electrical energy. Each energy generator comprises a closed-loop controller for controlling controlled variables of the energy generator.

According to the invention, the control device comprises a request detection device for detecting at least one energy supply request for at least one energy form heat and/or cold and/or electrical energy. The control device also comprises a criteria determination device configured to determine, for each of the energy generators, whether an energy generator specific criterion is present which specifies exactly one of the three possible switching states for the energy generator.

Furthermore, the control device comprises a target value determination device for determining target values for each energy generator for meeting the at least one energy supply request based on the energy generator specific criterion. The control device also includes a target value output device for outputting the target values to the closed-loop controllers.

The control of a multivalent energy supply system may be particularly complex and usually requires a customized solution tailored to the specific system configuration such as a programmable logic controller. Depending on the complexity of the energy supply system, the development effort and the associated costs for providing a system control may be very high. In addition, when installing a multivalent energy system, the configuration of a corresponding control may be very complicated and time-consuming.

Therefore, it is an object of the invention to provide methods allowing an optimal control of a multitude of different multivalent energy supply systems with differently structured infrastructures and different components. In addition, a control device is to be provided which can optimally control a large number of different multivalent energy supply systems.

The control device according to the invention may be configured to carry out the method of controlling a multivalent energy supply system according to the invention. In particular, the control device may control a variety of different system configurations without being reprogrammed for each new or changed system configuration.

Controlling a multivalent energy supply system may be simplified according to the invention by defining a plurality of criteria in a graded order of priority. A criterion may represent a condition for switching on or off an energy generator. A criterion may also set or influence maximum or minimum target values for energy generators.

The control device may evaluate an order of criteria of different priority for controlling a multivalent energy supply system. The highest priority is given to energy generator specific criteria. An energy generator specific criterion may be that the energy generator is given a minimum runtime. The minimum runtime may specify that the energy generator must not be switched off. The energy generator may also be given a minimum down time which prevents the energy generator from being switched on.

In addition, an energy generator specific criterion may also specify minimum or maximum target value limits. For example, an energy generator specific criterion may specify a maximum volume flow (or mass flow or electric current) through the energy generator and/or a maximum power.

Since the energy generator specific criteria should have the highest priority, the control device must not be able to change these criteria. The control device must accept the criteria from the energy generators unchanged.

System specific criteria may be placed at the second highest position in the order of criteria. These criteria are independent of the energy forms of heat, cold and electric current and may, for example, set a minimum state of charge of a buffer storage. As a result, in the case of heat, for example, a buffer frost protection can be ensured. In addition, a maximum state of charge of a buffer storage may be specified. In order to ensure system frost protection in a heating system, a minimum system flow temperature may also be set. In addition, a maximum system flow temperature may also be set. Accordingly, minimum and maximum system values for electrical energy and/or cold may also be specified. By specifying system-specific criteria, an emergency operation of the energy supply system can be realized.

In third position in the order of priority, energy form specific criteria may be set. These may also be generator-specific for each energy form. For example, depending on an outside temperature, certain energy generators of an energy form may be locked if this is permissible in accordance with energy generator specific criteria. The energy form specific criteria may, for example, be season-dependent. In this way, it may be ensured that sufficient heat is always provided in the cold of winter. Furthermore, it may be ensured that always sufficient cold and/or electrical energy is provided in the summer at high outside temperatures. In addition, it may be specified that, at any time, a specified minimum amount of electrical energy should be provided.

In fourth position, criteria which are evaluated per cascade may be defined. At first, also group specific criteria may be defined. These may specify whether an entire group should be switched on or off and/or may be switched on or off. Within a group, position-specific criteria may also be defined. Position-specific criteria may be predetermined, for example, based on switch-on integrals and/or switch-off integrals. As a result, energy generators are, for example, when performing runtime equalization within a group, prevented from switching off immediately after swapping positions to prevent a drop of a controlled variable below a predetermined target value. The energy generator which moves to a position further back within its group within the group due to the runtime equalization may remain switched on until the actual value of the corresponding controlled variable increases above a threshold value after a specific time.

In the context of the invention, an energy generator is "switched on" if the power provided by the energy generator energy exceeds a predetermined power threshold. Thus, for "switching on" an energy generator, the power provided by the energy generator is increased until the power provided by the energy generator is greater than the predetermined power threshold.

In the context to the invention, an energy generator is "switched off" if the power provided by the energy generator falls below a predetermined power threshold. For "switching off" of an energy generator, the power provided by the energy generator is decreased until the energy provided by the energy generator is less than the predetermined power threshold.

A multivalent energy supply system is an energy supply system which uses more than one energy carrier as energy source. It comprises at least two energy generators, each providing a usable form of energy, such as heat, cold, mechanical energy and/or electrical energy. Heat can be provided, for example, to a hot water supply and/or a heating system and/or as process heat, for example for industrial applications. For transporting the heat, a fluid carrier medium, i.e., a gas or a liquid, is usually used, for example water or steam.

In order to operate a multivalent energy supply system optimally, the control of the energy supply system has to be carried out based on the specific characteristics of the energy generators which depend, inter alia, on the type of energy carrier used. The present invention is aimed, among other things, at combining specific characteristics of energy generators in a synergetic manner. In other words, the method according to the invention allows optimally combining the respective merits of different energy carriers with each other, in particular with regard to the availability and/or energy content. This is achieved by coordinated control of the energy generators, so that from the multivalency of the energy supply system, i.e., the use of different energy carriers, an advantage over monovalent energy systems using only one energy carrier may be obtained.

In particular, a multivalent energy supply system may use a combination of regenerative and fossil energy carriers, so that a particularly reliable operation of the energy supply system can be achieved, since a time-varying availability of one of the energy carriers used may be compensated by using at least one further energy carrier. In this way, the method according to the invention allows the control of the energy supply system to react to conditions that change over time.

Coordinated control of the closed-loop controllers means that the control device takes into account the totality of the energy generators in the energy supply system when determining the target values. In the presence of a plurality of energy supply requests for different energy forms, this may involve taking into account which energy generator can provide which energy form(s). Further, it may be necessary for the control device to determine if multiple energy generators are required to meet the energy supply request(s). When selecting the energy generators to meet the energy supply request(s), the control device may also take into account how much time the different energy generators require to reach a particular target value and/or if restrictions on the availability of an energy carrier utilized by the energy generators are present.

In order to allow a coordinated control of the closed-loop controllers, the control device may be configured to detect a plurality of specific characteristics of the energy generators and, if appropriate, to compare them to one another and/or to recognize and take into account dependencies between the energy generators. In particular, specific characteristics with regard to the power output of the energy generator can be taken into account in the control of the energy supply system. Specific power output characteristics include, among other things, a maximum power that can be provided by the energy generator and the time it takes for the energy generator to transition from a switched-off operating condition to an optimal operating condition.

The at least two energy generators of the multivalent energy supply system use at least two different energy carriers in total. As energy carriers, fossil and/or regenerative energy carriers may be used. For example, two or more of the following may be used: coal, natural gas, heating oil, diesel, gasoline, hydrogen, biogas, wood (for example in the form of pellets and/or wood chips) or other types of biomass, geothermal energy, solar radiation, wind, electrical energy (for example, electric current and/or electric voltage), long-distance heating, mechanical energy (for example, hydropower). By using different energy carriers, the reliability of the energy supply may be improved, since a dependence on the availability of an energy carrier (such as the sun and/or wind) may be reduced.

The multivalent energy supply system according to the invention comprises at least two energy generators, each of which uses at least one of the aforementioned energy carriers to provide energy in the form of heat, cold and/or electrical energy, for example two or more from the following list which is a non-exhaustive listing: oil-fired boiler, gas-fired boiler, condensing boiler, gas engine, gas turbine, combined heat and power plant (CHP), wood boiler, (electric) heat pump, photovoltaic system, wind turbine, solar thermal collector, fuel cell. In addition, a combined heat an energy generation may, for example, be implemented with a Stirling engine.

The various energy generators may have very different specific characteristics and may accordingly have different or even conflicting requirements during their operation in a multivalent energy supply system. In the following, typical specific characteristics of selected energy generators are described by way of example.

An oil-fired boiler or gas-fired boiler uses the fossil energy sources heating oil or natural gas and provides heat which is usually transferred to a fluid carrier medium, typically water. It can supply large power outputs within a short time and can be switched off quickly. Such a boiler is easy to control and may therefore be used in modulating operation. A boiler also allows frequent switch-on/off operations and may therefore also be used in two stages in on/off operation. Oil-fired boilers and gas-fired boilers are thus particularly flexible in their operation and are often used as so-called peak-load boilers which are to respond quickly to fluctuations in energy supply requests. The overall energy costs which take into account the costs of the energy carrier itself, as well as maintenance costs and the investment costs of the boiler, are at a medium level compared to other energy generators.

A combined heat and power plant (CHP) usually uses fossil energy sources, but could also operate on biogas or hydrogen derived from renewable sources. It supplies heat and electrical energy (electric current and/or electric voltage), is easy to control and can quickly be ramped up to high power output and quickly shut down again. Unlike the boiler, however, the CHP should not be switched on or off frequently. In order to operate a CHP economically, it is usually used in continuous operation. Despite the high investment costs, the combined heat and power plant as a whole therefore has relatively low overall energy costs.

A wood boiler uses solid fuel from a renewable energy source (wood, for example in the form of pellets or wood chips) and provides heat. It is only moderately controllable and can only relatively slowly be ramped up to high power output or shut down again. Due to the long switching times, a wood boiler should not be switched on or off frequently. When switching off, for safety reasons it is usually necessary to wait until the fuel already in the combustion chamber is completely burnt. When switching on, however, first sufficient fuel must be transported into the combustion chamber and ignited. It causes relatively low overall energy costs. Therefore, it is usually used as a base load boiler which is as kept in continuous operation if possible and can meet a minimum energy demand of an energy supply system. In order to be able to react to fluctuations in the demanded amount of energy, a wood boiler is usually used in combination with a buffer storage which intermediately stores the heat provided by the wood boiler when the amount of heat demanded by the consumers is less than the amount of heat provided by the wood boiler. If the amount of heat demanded by the consumers is greater than the amount of heat provided by the wood boiler, first the amount of heat stored may be released from the buffer storage again. Alternatively or in addition to the buffer storage, a gas boiler is often used together with wood boilers in an energy supply system. The gas boiler is then turned on when the demanded amount of heat exceeds the amount of heat available from the wood boiler and from the buffer storage. The gas boiler is therefore used as a peak load boiler. Usually, wood boilers are operated in pairs so that at least one of the two wood boilers is always ready for operation.

An electric heat pump consumes electrical energy and therefore uses fossil and/or regenerative energy sources depending on which source the electrical energy was derived from. It can provide heat and/or cold, but has a limited temperature range. Usually, a heat pump can provide a maximum flow temperature of 60° C. It is easy to control and can quickly be ramped up to high power output and can also be quickly shut down again. However, it may not be switched on or off frequently. It causes relatively low overall energy costs.

Another component that is used in many multivalent energy supply systems is a buffer storage. The buffer storage may intermediately store energy provided by energy generators. Depending on the energy form, a buffer storage may be, for example, a storage for electrical energy, for example in the form of batteries or capacitors, or a heat storage and/or cold storage, for example in the form of an insulated water tank. In addition, energy can also be stored in the form of mechanical energy, for example in a flywheel. A buffer storage allows at least partial decoupling of the operation of the energy generators from the energy consumers. As a result, the efficiency of a multivalent energy supply system may be improved.

According to the invention, the multivalent energy supply system may be configured to provide energy in the form of heat, cold and/or electrical energy. For each energy form, at least one energy supply request may be present. Energy supply requests for each energy form may be detected independently of each other by the control device and may further be processed into corresponding target value requests to energy generators. For example, an energy supply request may come from a consumer, a plurality of consumers, or an external or internal device that coordinates requests from a plurality of consumers. For each energy form, it is also possible to define criteria for energy generators that are assigned to the corresponding energy form. Energy supply requests for each energy form may be independently detected by the control device and further processed into corresponding target value inputs to energy generators Furthermore, there may be more than one energy supply request for an energy form (e.g., heat or cold or electrical energy. For this purpose, one or more energy forms may be categorized, for example, into several energy sub-forms based on the connection of the respective energy generator and/or types of consumers present in the consumer circuits. This may achieve, for example, that the energy form of heat (or cold or electrical energy) can be provided to different consumer circuits with different energy supply requests. Herein, the energy generators affected by the energy supply request may also be connected to separate consumer circuits. Alternatively, it is possible to switch between different consumer circuits by means of valves, throttles and/or switches.

For the energy form of heat, for example, different energy supply requests may be present when different flow temperatures are requested for the hot water supply (drinking water) and heating and/or process heat (service water or steam).

The classification into the energy forms of heat, cold and electrical energy may also be supplemented by other energy forms. Furthermore, an energy form may also be subdivided into energy sub-forms depending on usage. For example, the energy form of heat may be subdivided into hot water, thermal heat and/or hot air. The energy form of cold may be subdivided, for example, into a building cooling system (for example, an air conditioning system with fresh air supply) and a device cooling system (for example, a coolant for cooling machines).

Since there may be energy generators in the multivalent energy supply system which can simultaneously provide more than one energy form, it may be necessary to determine under which conditions such energy generators should be switched on or off and/or be regulated or controlled. The control device may prioritize certain energy forms in the control of the energy generator, so that an energy supply request for a first energy form are preferably treated over an energy supply request for a second energy form. The control device may also set or acquire a priority order for the energy forms. For example, the priority order may be set manually by a user. The control device may detect and process energy supply requests based on the respective energy form.

For example, a CHP supplies both heat and electrical energy (e.g., electric current and/or electric voltage). Consequently, two different requests from the two energy forms may be present for a CHP. However, since the electrical energy supplied by the CHP can be fed into a public power grid at any time in the absence of a corresponding request of the consumers supplied by the multivalent energy supply system, the CHP is usually used in continuous operation.

The energy form of heat includes all energy generators that can provide heat energy. In addition the control unit takes into account conditions for switching on and/or switching off for the energy form which are related to an energy supply request of heat, for example, a requested system flow temperature and/or a buffer temperature. Similarly, energy generators are assigned to the energy forms of electrical energy and cold.

Each energy generator in the energy supply system includes a closed-loop controller for controlling controlled variables of the energy generator. Controlled variables of an energy generator include, for example, a boiler temperature of the energy generator, a volume and/or mass flow of a carrier medium through the energy generator, a temperature of the carrier medium in the flow and/or the return flow of the energy generator, a power consumption of the energy generator and/or a power output of the energy generator. In an energy generator that provides electrical energy, the controlled variables may relate to an electrical current, an electrical power and/or an electrical voltage.

The closed-loop controllers are coordinated by a control device which is superordinate to the closed-loop controllers. The control device is configured to detect an energy supply request for energy in the form of heat and/or cold and/or electrical energy. An energy supply request may be, for example, a request for a certain flow temperature or a certain temperature in a buffer storage, in particular in a certain area of the buffer storage, or be an electric power. For example, the energy supply request may be generated by a consumer or a group of consumers and be output to the control device via an appropriate data communication link.

The control device is further configured to determine, for each of the energy generators, target values for meeting the energy supply request depending on the particular energy carrier being used, the target values also including instructions for switching on or off an energy generator.

The control device is further configured to output the target values to the closed-loop controllers. For communicating with the closed-loop controllers, the control device uses a suitable data communication link.

The various energy carriers used in the energy supply system may put requirements on the energy supply system, for example due to different costs and/or fluctuating availability. In order to ensure an uninterrupted operation of the energy supply system if possible, the control device determines the target values for the energy generators, for example, based on the current and/or also precalculated, predetermined or estimated availability of the utilized energy carriers.

For example, the control device may be configured to operate preferred energy generators which use, for example, particularly cost-effective and/or regenerative energy carriers at high or maximum power. Non-preferred energy generators which use, for example, less cost-effective and/or fossil energy carriers and which are provided to cover the peak loads should not be used to store heat in a buffer storage. Preferred energy generators are allowed to use the buffer storage to realize longer runtimes or fewer switching operations.

The control device according to the invention of a multivalent energy supply system may predetermine target values for the closed-loop controllers of the energy generator and/or issue switching requests. In addition to the switching requests which determine whether an energy generator must be switched on or off, the control device may also issue releases which allow, but not enforce, switching on or off an energy generator.

Switching energy generators on and off by the control device in a purposeful manner alone would not be sufficient to meet the energy supply request, because the switching alone does not define at what modulation level or at what temperature level the released energy generator is to operate. Therefore, target value specifications by the control device are required.

The different controlled variables of an energy supply system (for example, system flow temperature, and buffer temperature) require individual target value specifications to the individual energy generators. In addition, boundary conditions should also be taken into account. These boundary conditions may include, for example, control strategies, predetermined preferred energy generators and/or buffer dynamics.

The selective release of energy generators is not sufficient, for example, to control a system flow temperature and/or a buffer temperature to reach a desired level with a required power. This is because it is not defined by the release which power at which temperature level each approved energy generator should provide. Therefore, additional target value specifications are required. In a multivalent energy supply system, different energy generators with individual generator-specific restrictions (for example, minimum and maximum values of the power, the volume flow or the runtimes) may be represented. In addition, the extensive configuration options allow energy generators to work at different controlled variables (e.g., system flow temperature, buffer state of charge). These circumstances require that each energy generator receives individual target values in addition to the release or switch request.

Preferably, each closed-loop controller of each energy generator has a defined interface to receive target values from the control device, or to make actuating variables available for achieving its control targets. The actuating variables may include: an (electric) power that the energy generator introduces into the energy supply system, a volume or mass flow (or electric current) from the energy generator into the system, an energy generator flow temperature (an electric voltage).

The control device cannot act directly on these controlled variables, but merely outputs target values to a closed-loop controller. The regulation of the controlled variables to the nominal values remains the responsibility of the closed-loop controllers. Instead of a fixed target value, the control device may also specify an operating range (by an upper and lower restriction or a threshold value, respectively) to a closed-loop controller in which the controlled variables can be set by the closed-loop controller. An operating range defined by the control device may accordingly be defined by one or more target values which define minimum and/or maximum values for the controlled variables. Controlled variables are, for example:

A maximum thermal or electrical power (or heating power, cooling power) of the energy generator which must not be exceeded. The requirement is, for example, a percentage in relation to the physically possible maximum power of the respective energy generator.

A minimum thermal or electrical power (or heating power, or cooling power) of the energy generator which the power may not fall below. The requirement is, for example, a percentage in relation to the physically possible maximum power of the respective energy generator.

A maximum volume flow (or mass flow or electric current) of the energy generator flowing from or through the energy generator into the energy supply system. The requirement is, for example, a percentage in relation to the physically possible maximum flow of the respective energy generator.

A minimum volume flow (or mass flow or electric current) of the energy generator flowing from or through the energy generator into the energy supply system. The requirement is, for example, a percentage in relation to the physically possible maximum flow of the respective energy generator.

A minimum and/or maximum energy generator flow target temperature or electric voltage. The requirement is in degrees Celsius or Volt. The specific values that the control device sends to the closed-loop controllers of the energy generator are also referred to as target values below.

Advantageous embodiments and developments which may be used individually or in combination with each other, are the subject of the dependent claims.

The control device may be configured to detect an operation mode from a predetermined set of operation modes whereby system specific criteria, such as minimum and/or maximum values, may be set.

The operation modes may, for example, be season-dependent or weather-dependent. Thus, the control device of the energy supply system may, for example, be configured to determine the ambient temperature and to prevent freezing of water pipes in case of frost by setting a correspondingly calculated minimum temperature as a target value (e.g., for a flow temperature). Similarly, at very high ambient temperatures, a mode of operation of the energy supply system may be set, in which, for example, only those energy generators that provide electrical energy and/or cold should be operated.

Furthermore, operation modes for fault situations may be defined, so that in the event of a fault (for example, a water pipe breakage, an electrical short circuit or the like) an emergency operation of the energy supply system is set.

In an emergency operation of the energy supply system, the control device may be configured, for example, to issue a release to all closed-loop controllers such that all energy generators may be operated essentially autonomously, i.e., independently of each other, and may optionally only be controlled by the closed-loop controllers.

A variety of threshold values, operating ranges, minimum values and/or maximum values for system operating parameters, for example buffer temperatures and/or flow temperatures, may be stored in the control device for a plurality of predetermined operation modes. If the control device detects that one of the specified operation modes is to be set, the target values for the energy generators are determined based on the stored threshold values, operating ranges, minimum values and/or maximum values.

An order of switching on and/or off energy generators may be divided into multiple cascades, wherein each cascade may include one or more sets of energy generators. Each cascade may include group specific criteria. In each group, position-specific criteria may be defined which may define specific switching specifications, releases and/or target value limits depending on the position within the group.

A cascade is a level of classification of the energy generators superordinate to groups and specifies a sequential order of the energy generators or groups of energy generators contained therein, respectively. Cascades are independently controllable. Thus, multiple sequential orders of energy generators executable in parallel may be defined, wherein different criteria for switching on and/or off may be set, respectively.

In each group, a sequence of energy generators is defined, wherein the sequence may be variable, for example, depending on controlled variables of the energy generator. Thus, for example, runtime equalization between several energy generators of a group may be realized. The order of switching on and/or off energy generators within a cascade may be determined depending on an order of the groups and the sequences within the groups.

Within each cascade, it may be decided autonomously whether and according to which criteria energy generators should be switched on and/or off in the order. Therefore, a variety of criteria may be set for each cascade which define, for example, thresholds depending on energy supply requests.

The cascades may be executed in parallel by the control device. As a result, the quality of control may be significantly improved compared to methods in which only a single linear sequence of energy generators is defined. In addition, by executing cascades in parallel, it is possible to prevent the switching sequence from getting stuck at an energy generator in which a switching operation is prevented by a criterion with higher priority.

The control device may preferably detect, from each of the closed-loop controllers, restrictions with respect to the controlled variables of the respective energy generator, wherein the restrictions relate to minimum and/or maximum values of power provided by the energy generator and/or indicate whether the respective energy generator must be switched on or off.

These restrictions may be generator specific restrictions. As a restriction, for example, a minimum value and/or a maximum value may be specified which may also be equal in value. In this way, an operating point can be set for the energy generator at which an energy generator is to be operated. Such an operating point can ensure, for example, a particularly high efficiency of the energy generator. By detecting the restrictions, it can be ensured that the control device takes into account specifications by the energy generators in a coordinated manner when determining the target values for meeting the energy supply requests. In particular, it can be avoided that the control device determines a target value for an energy generator which cannot meet this target value due to its individual restrictions.

In addition, the control device may be configured to detect, from each of the closed-loop controllers, specific characteristics regarding a power output of the respective energy generator which indicate how an energy generator reacts to a change in the controlled variable. Such specific characteristics may represent a characteristic curve of an energy generator, indicating, for example, what power the energy generator outputs when a particular actuating variable is set. The specific characteristics may relate, in particular, to dynamic properties of the energy generator. For example, they may describe how much time an energy generator needs to ramp up to full load (maximum power output) or how long it takes to switch off the energy generator (no power output).

A specific characteristic of an energy generator may also depend on a hydraulic connection of the energy generator in the energy supply system. It can thus be achieved that energy generators are controlled in accordance with their physical arrangement in the energy supply system. In this way, for example, the fulfillment of a request for a certain flow temperature may be simplified.

A specific characteristic of an energy generator according to the invention may also be the energy form(s) provided by it. In addition, the specific characteristic may be the energy carrier used by the energy generator and/or may depend on the type of energy carrier used.

In a preferred method, the control device may detect if there is an energy supply request for providing heat and electrical energy present. If so, the control device determines whether one of the energy generators can provide heat and electrical energy. If so, the control device determines target values for the energy generator for providing heat and electrical energy based on the energy supply request. Alternatively, the control device may select at least two energy generators such that at least one of the energy generators provides heat and at least one other energy generator provides electrical energy.

The generator specific criteria may depend on the type of energy carrier used by the energy generator. In some cases, dynamic restrictions of an energy generator may also depend on the fuel used. As explained above, a wood boiler, for example, takes much more time to start up than a gas boiler. Other generator specific criteria may be related to the availability or costs of the energy carrier.

For example, an energy generator using the sun as an energy source cannot provide energy at night. A wind turbine cannot provide energy during a lull. In case of a heat pump, a minimum interval in which the heat pump may not be switched off or a period after a shutdown in which the heat pump may not switched on may be predetermined. All these and other specific characteristics may affect the operation of a multivalent energy supply system.

Preferably, the method may comprise a step of determining whether there is an energy supply request for more than one of the energy forms of heat, cold, or electrical energy. Then a classification of the cascades may be determined based on the energy form provided by the energy generators. The control of the energy generators then is performed by the control device based on the specified determined classification of the cascades into energy forms.

The method may further comprise a step of determining whether there is more than one energy supply request for an energy generator. If there is more than one energy supply request for an energy generator, the control device may determine which of the specific energy supply requests is to be prioritized. The target values are then determined for the one energy generator based on the priority energy supply request.

The control device preferably comprises a device for detecting restrictions. The restrictions may relate to minimum and/or maximum values of power provided by an energy generator and/or indicate whether the respective energy generator must be switched on or off.

The control device may further comprise a coordinating unit which is configured to output switching requests and/or target value specifications from the three energy forms to the target value output device in accordance with a prioritization of the energy forms.

As already described above, an energy supply request for a particular energy form may be given priority. The advantage of this method may be that conflicts between conflicting energy supply requests can be avoided. Thus, a reliable operation of the energy supply system can be ensured.

BRIEF DESCRIPTION OF THE DRAWINGS

Further advantageous embodiments will be described in more detail below with reference to an embodiment shown in the drawings, to which the invention is not limited, however.

In the figures.

DETAILED DESCRIPTION OF EMBODIMENTS

Figure 1:
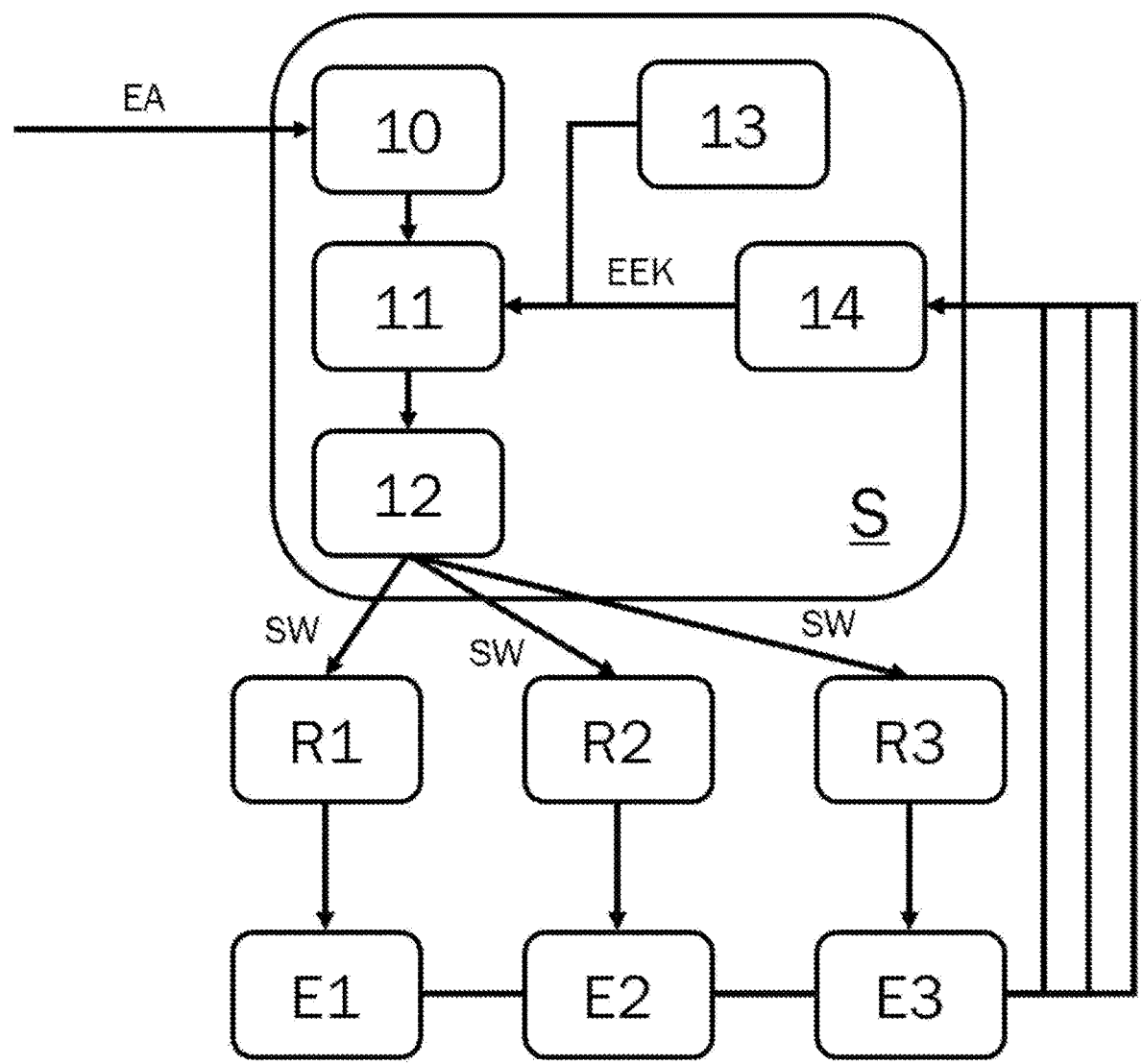
FIG. 1 shows a representation of control logic of a multivalent energy supply system according to a first embodiment.

In the following description of a preferred embodiment of the present invention, like reference characters designate like or similar components.

First Embodiment

FIG. 1 shows a schematic structure of a control device S for controlling a multivalent energy supply system according to a first embodiment including three energy generators E1-E3. The three energy generators E1-E3 are controlled by a respective closed-loop controller R1-R3.

Each energy generator E1-E3 can assume three possible switching states. Either the energy generator E1-E3 must be switched on, the energy generator E1-E3 must switched off, or the energy generator E1-E3 may be switched on or off.

The control device S also comprises a request detection device 10 which is configured to detect at least one energy supply request EA for at least one energy form of heat and/or cold and/or electrical energy. The energy supply request EA may either come from outside, for example from a plurality of consumers (not shown), and be transmitted to the request detection device 10 of the control device S via a suitable data line, or may also be generated internally by a request generating device (not shown) in the control device S itself.

The control device S further comprises a target value determination device 11 which is configured to determine target values SW for a plurality of energy generators E1-E3 of the multivalent energy supply system. The target value determination device 11 transmits the generated target values SW to a target value output device 12 which outputs the target values SW via suitable data lines to the closed-loop controllers R1-R3 of the energy generators E1-E3.

Moreover, the control device S includes a criteria determination device 14 configured to determine, for each of the energy generators E1-E3, whether an energy generator specific criterion EEK is present which specifies exactly one of three possible switching states for the energy generator E1-E3. The criteria determination device 14 outputs the determined energy generator specific criteria EEK to the target value determination device 11, so that the target values SW can be determined depending on the energy generator specific criteria EEK.

Furthermore, the control device S includes an (optional) device 13 for detecting restrictions. The detected restrictions may, for example, relate to minimum and/or maximum values of power provided by one of the energy generators E1-E3. The restrictions may be detected directly from the energy generators E1-E3 or their closed-loop controllers R1-R3. A suitable communication link between the energy generators E1-E3 or their closed-loop controllers R1-R3 and the device 13 for detecting restrictions may serve this purpose.

Alternatively, the restrictions may be generated by the control device S, be predetermined by a user or be output from an external device to the control device S.

The control device S may be configured, for example, as a microprocessor with a CPU. The request detection device 10, the target value determination device 11, the target value output device 12, the device 13 for detecting restrictions and the criteria determination device 14 may each be configured as separate electronic components of the control device S. Alternatively, the CPU of the control device S may be configured to take over one, several or all of the tasks of the target value determination device 11, the target value output device 12, the device 13 for detecting restrictions and/or the criteria determination device 14.

Second Embodiment

Figure 2:
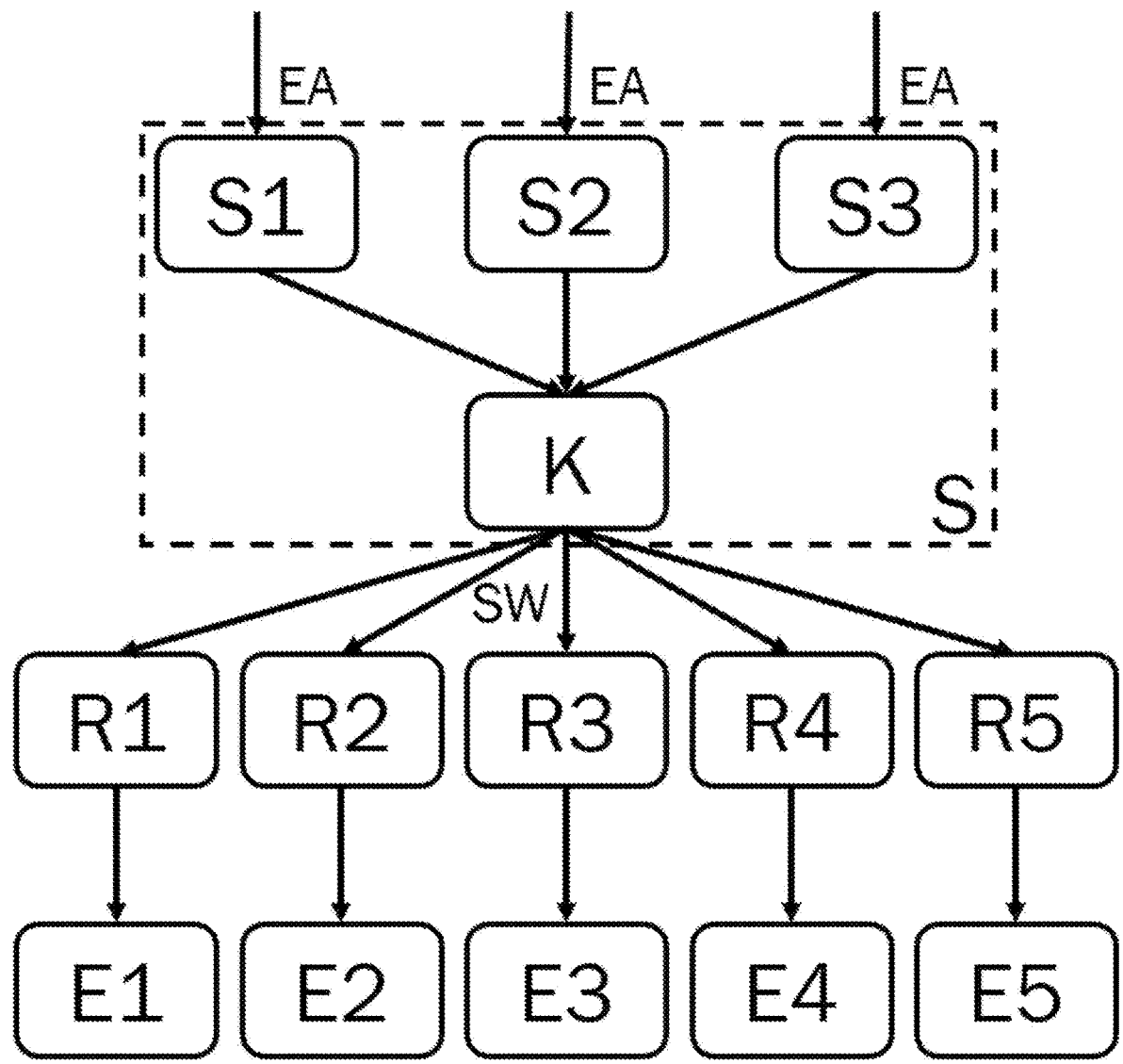
FIG. 2 shows an illustration of control logic of a multivalent energy supply system including five energy generators for three energy forms according to a second embodiment.

FIG. 2 shows a second exemplary embodiment of a multivalent energy supply system with five energy generators E1-E5. The control device S comprises three control units S1-S3 and a coordinating unit K. The control units S1-S3 each detect an energy supply request EA for each energy form.

For example, the first control unit S1 may detect an energy supply request EA in the form of a heat request, the second control unit S2 may detect an energy supply request EA in the form of a cold request, and the third control unit S3 may detect an energy supply request EA in the form of a request for electric energy. Since there may be energy generators in the energy supply request which provide more than one energy form, such as a combined heat and power plant which provides electrical energy and heat, the control device S may detect energy supply requests EA for various energy forms which relate to the same energy generator.

The coordinating unit K is configured to check the energy supply requests EA by the three control units S1-S3 and the target values determined therefrom for conflicts and to coordinate the use of the energy generators accordingly. For this purpose, the individual energy forms may be given different priorities. For a CHP, for example, it would make sense to give priority to a request for electrical energy so that it is not switched off if there is no heat request.

The coordinating unit K is configured to regulate the interaction between the different energy forms F1-F3. Energy generators which provide multiple energy forms and which receive a switch-on request with respect to a first energy form F1 should not be allowed to be switched off due to energy supply requests EA for a second energy form F2 or third energy form F3. For this purpose, the coordinating unit K assigns priorities to the energy forms. The energy form which first issues a switch-on request to an energy generator receives the highest priority. The energy form retains the highest priority as long as its request is present. If, in a calculation step, several energy forms issue a switch-on request to an energy generator, the priority is determined according to a predetermined priority order.

The coordinating unit K may also take into account that as few switching operations as possible should occur. In particular, the coordinating unit K also takes into account generator-specific specifications, since there are energy generators which may not be switched for a certain period after being switched on or off. Other energy generators may be switched on and off virtually indefinitely.

If the coordinating unit K receives a request to switch on or off an energy generator, the coordinating unit K may perform an estimation of the energy demand of the different energy forms. In addition, the coordinating unit may make an estimate of a future energy demand. Accordingly, the coordinating unit K may determine whether switching energy generators on or off may be avoided.

Third Embodiment

Figure 3:
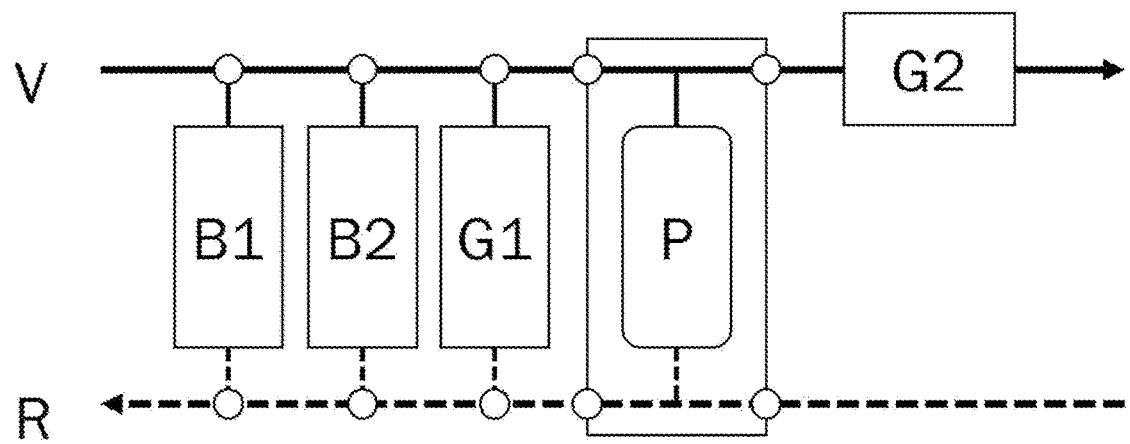
FIG. 3 is a hydraulic diagram of a multivalent energy supply system according to a third embodiment including two CHPs and two gas boilers.

FIG. 3 shows a schematic illustration of a third embodiment of a multivalent energy supply system for providing heat and electrical energy. FIG. 3 shows a hydraulic diagram (a schematic representation of the infrastructure) of the energy supply system, in which heat is released to a fluid carrier medium, for example water. The carrier medium transports the heat via a flow V to a consumer circuit (not shown). The flow is shown as a solid arrow which illustrates the flow direction of the carrier medium. In the consumer circuit, a plurality of consumers, for example, a plurality of radiators, may be arranged.

Via a return flow R, the carrier medium flows from the consumer circuit back to the energy supply system. The return flow is shown as a dashed arrow illustrating the flow direction of the carrier medium. The carrier medium may be caused to flow, for example, by means of circulating pumps which may be arranged in the generator circuit, for example in the energy generators B1, B2, G1, G2, and/or in the consumer circuit. In addition, valves and/or throttles and/or sensors for measuring the flow and/or the temperature in the energy generators B1, B2, G1, G2 and/or in the flow V and/or in the return flow R may be arranged to in order to control or regulate a flow through the energy generators B1, B2, G1, G2.

The energy supply system comprises two combined heat and power plants (CHPs) B1, B2 and two gas boilers G1, G2, wherein the two CHPs B1, B2 are each arranged in parallel to each other between the flow V and the return flow R. Via the return flow R, the carrier medium coming from the consumer side flows to the energy generators which supply heat to the carrier medium. Via the flow V, the carrier medium flows to the consumer circuit (not shown).

A first gas boiler G1 is also arranged in parallel to the CHPs B1, B2 downstream in the flow V. Further downstream in the flow V, a buffer storage P is arranged in parallel to the first gas boiler G1 and the CHPs B1, B2. Downstream of the buffer storage P, a second gas boiler G2 is arranged in series in the flow V, so that the second gas boiler G2 may raise the flow temperature directly. Due to the arrangement of the second gas boiler G2 behind the buffer storage in the flow, it cannot influence the temperature of the water stored in the buffer storage.

The CHPs B1, B2 and the gas boilers G1, G2 each include a closed-loop controller R1, R2, R3, R4 for controlling controlled variables of the energy generators. A control device S is connected to the closed-loop controllers R1, R2, R3, R4 and may periodically fetch the set controlled variables and output target values SW to the closed-loop controllers R1, R2, R3, R4. The control logic may thus be implemented as shown in FIG. 1, but with four energy generators B1, B2, G1, G2.

The control device S of the energy supply system of the embodiment may be controlled according to specifications of a set operation mode. The first gas boiler G1 should only be used when both CHPs B1, B2 are already in operation and the heat provided by them in the flow V is insufficient to meet an energy supply request EA, for example in the form of a required temperature in the buffer storage P or a system flow temperature at the transition (to the right in FIG. 3) to the consumer circuit. According to the operation mode, the second gas boiler G2 should only be used when both CHPs B1, B2 and the first gas boiler G1 are already in operation and the heat provided is insufficient to meet the energy supply request.

Figure 4:
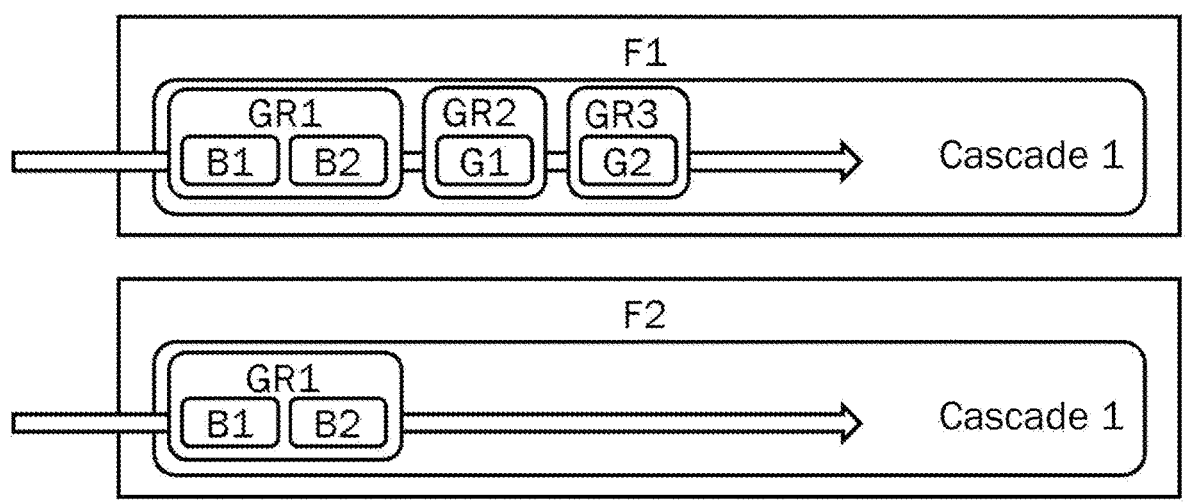
FIG. 4 shows a classification of the energy generators of the third embodiment into energy forms, cascades and groups.

It will now be explained with reference to FIG. 4 how an order of switching on or off in the multivalent energy supply system is determined. Since the multivalent energy supply system may provide both heat and electrical energy, two energy forms F1 (for heat) and F2 (for electrical energy) are provided.

Among the CHPs B1, B2, runtime equalization is to take place. For this purpose, the two CHPs B1, B2 are assigned to a group GR1. Within the group, the CHPs B1, B2 may exchange their positions. One criterion for determining at which position a CHP should be placed in the group may be the runtime difference between the CHPs B1, B2. The runtime difference is thus an energy generator specific criterion, however. An energy generator specific criterion shifts with the swap of positions and thus remains with the energy generator. In order to prevent constant swapping of positions of the two CHPs B1, B2 within the group GR1, in addition, a minimum runtime difference may be set, from which on runtime equalization may take place. The control device records the runtimes of the CHPs and determines the order of the CHPs depending on the recorded runtimes.

Position-specific criteria always remain tied to their position and do not move with the swap of energy generators. A position specific criterion may, for example, be specifications as to how an energy generator should be switched on or off in time, such as, for example, a switch-on integral and/or a switch-off integral. Another example of a position criterion switching off an energy generator based on a buffer temperature.

By using position criteria for switching on or off energy generators, a behavior of the energy supply system may be defined independently of the respectively energy generator placed in the position. Thus, for example, threshold values may be defined, wherein exceeding or falling below these causes a particular predetermined switching behavior to be carried out. Thus, it may be specified, for example, for each position in the order of the energy generators, if the energy generator at the respective position is to be switched off or switched on when the threshold value is exceeded or fallen short of. It is thus possible to set the behavior of an energy supply system with a possibly unknown configuration in advance within certain limits, regardless of the energy generators actually used later on.

The order in which the first gas boiler G1 and the second gas boiler G2 are switched on shall be fixed. There should be no runtime equalization between the gas boilers G1, G2. The reason for this may be, for example, that the first gas boiler G1 has a better degree of utilization (for example, a condensing boiler) than the second gas boiler G2 (for example, a low-temperature boiler). To achieve this, the two gas boilers G1, G2 are assigned to two separate groups GR2, GR3. The efficiency of gas boilers is an example of a specific characteristic of the energy generators.

The three groups GR1, GR2, GR3 of the first energy form F1 may be assigned to a common cascade 1. The order of the groups GR1, GR2, GR3 may be fixed or variable. In order for the CHPs B1, B2 to reach as many operating hours as possible, the group GR1 is placed first in the cascade 1. Since the gas boiler G1 is to be preferably operated over the second gas boiler G2, the group GR2 with the gas boiler G1 is placed second in the cascade before the group GR3 including the gas boiler G2 1.

The control device also receives energy supply requests for a requested electrical energy (e.g., in the form of a current request and/or a voltage request). The CHPs B1, B2 may therefore be switched or regulated to meet the requirements for electrical energy in addition to an energy supply request for heat. Therefore, the CHPs B1, B2 are assigned to a second energy form F2 for electrical energy. Energy supply requests for electrical energy and/or switching requests for energy generators that provide electrical energy are taken into account by the control device S. In this example, the CHPs would be operated to provide heat as follows.

The first CHP B1 in the first position within the group GR1 (this may also be the second CHP B2 depending on the runtime equalization) is switched on when system flow temperature drops below a required system flow temperature. Here, the required system flow temperature is measured downstream of the second gas boiler G2 in the flow V. When a predetermined threshold value of the temperature in the buffer storage P which is measured at a layer located at the bottom in the buffer storage P is exceeded, the first CHP B1 is switched off.

The control of the second CHP B2 in the second position in the group GR1 is performed in a similar manner as that of the first CHP B1. If an undershooting of the required system flow temperature is detected in spite of CHP B1 being switched on, the control device S switches on the second CHP B2. When a predetermined threshold value of the temperature in the buffer storage P which is measured at a layer located in the center of the buffer storage P is exceeded, the control device S switches off the second CHP B2 again.

The gas boiler G1 is switched on when the CHPs B1 and B2 are switched on already and the system flow temperature falls below the required system flow temperature. Switching off the gas boiler G1 takes place when a threshold value of the temperature in the buffer storage P which is measured in an upper layer is exceeded.

If the first three energy generators in the cascade 1 of the energy form heat F1 are already in operation, but a system flow temperature is below the required system flow temperature is measured, the second gas boiler G2 is switched on. As soon as the required system flow temperature is exceeded, the control device S switches off the gas boiler G2 again.

In particular, the requirements from the energy form heat and from the energy form electrical energy are detected in a coordinated manner and further processed by the control device. This corresponds to finding a compromise between the requirements of the energy form heat and the energy form electrical energy. If the energy form heat would, for example, request switching off a CHP, the control device S would first check whether the energy form electrical energy continues to require the operation of the CHP before the release is withdrawn. For this purpose, the control device S may be configured to estimate the energy demand of the relevant energy form and to make the decision on the withdrawal of the release dependent on whether a continued operation of the CHP is required. By this method, the number of switch-on and switch-off operations may be minimized, whereby wear of the energy generator may be reduced.

According to the embodiment, a release may be issued to an energy generator when at least one energy form requires the release of the energy generator.

The release may then be withdrawn if no energy form requests the operation of the energy generator anymore.

Fourth Embodiment

Figure 5:
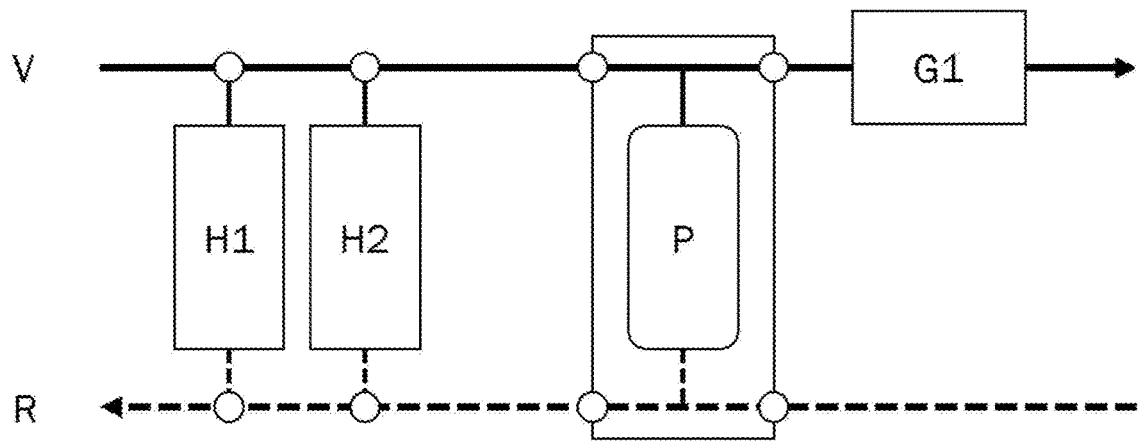
FIG. 5 is a hydraulic diagram of an energy supply system according to a fourth embodiment including two wood boilers and a gas boiler.

FIG. 5 shows a hydraulic diagram of an energy supply system according to a fourth exemplary embodiment. Similar to the third embodiment, the energy supply system includes a buffer storage P between the flow V and return flow R and a gas boiler G1 in the flow V downstream of the buffer storage P. A first wood boiler H1 and a second wood boiler H2 are each arranged in parallel to one another and in parallel to the buffer storage P upstream at the flow V1.

A control device S of the energy supply system according to the fourth embodiment is configured such that the wood boilers H1, H2 are preferably used, wherein the gas boiler G1 is to cover the peak load. As a result, the cheaper fuel wood is used for the base load (meeting a minimum energy request), while the inertia of the wood boiler H1, H2 is compensated by the use of a gas boiler G1 which can be quickly switched on and quickly switched off again. The gas boiler G1 may thus provide a peak load (meeting a maximum energy request).

Thus, by means of the control of the multivalent energy supply system which is adapted to the specific characteristics of the energy generator, a high quality of control may be achieved. An energy supply request in the form of a required system flow temperature at the transition to a consumer circuit (not shown) may thus be reached quickly and may then be maintained. This can be particularly advantageous if sensitive processes are connected on the consumer side (for example production machines).

As a further requirement for the control of the multivalent energy supply system it may be specified that a runtime equalization should take place between the wood boilers. In addition, the wood boilers H1, H2 are to be operated in the upper power range, where a particularly clean, i.e., low-emission, combustion may take place and the highest possible efficiency is achieved. This also allows for the longest possible operating period between maintenance operations to be achieved.

According to the prior art, usually a fixed switch-on and switch-off sequence is specified, in which no runtime equalization may take place. The first wood boiler H1 would then get much more operating hours than the second wood boiler H2. When a load changes (for example, by starting up the energy supply system after a standstill, such as after a maintenance or on a weekend), first the first wood boiler H1 is switched on. However, it takes a relatively long time until a sufficient amount of heat can be supplied to meet an energy supply request. Therefore in such a method, if the energy supply requirement is not met, first the second wood boiler H2 would be switched on (if necessary after a predetermined waiting time). Only after another waiting time could the gas boiler G1 also be switched on. The gas boiler G1 could supply the required amount of heat in a relatively short time. In such a method according to the prior art, it would take a relatively long time until the required amount of heat can be provided. In other words, the quality of control of the energy supply system would be severely limited in such a procedure. As a negative consequence, for example, production machines in the consumer circuit could go into operation only after a long time delay.

After a long warm-up period, the wood boilers H1, H2 supply heat (e.g., after one hour) and the system flow temperature rises, as more heat is produced than can be dissipated by the consumers or the buffer storage P. The flow temperature may rise above the required target value. Typically, the overshoot of the flow temperature above the target value is used as a criterion for switching off the gas boiler G1. This results in a corresponding poor quality of control, due to which the heat-consuming production machines in the consumer circuit could possibly go out of operation. If the power consumed is less than the sum of the nominal power of both wood boilers H1, H2, the wood boilers H1, H2 are operated at unfavorable operating points (each at low power).

If the power consumed is less than the sum of the basic output of both wood boilers H1, H2, the second wood boiler is taken out of operation after a short time. A poor energy balance and negative effects on durability and maintenance intensity of the wood boiler H1, H2 are the result.

Figure 6:
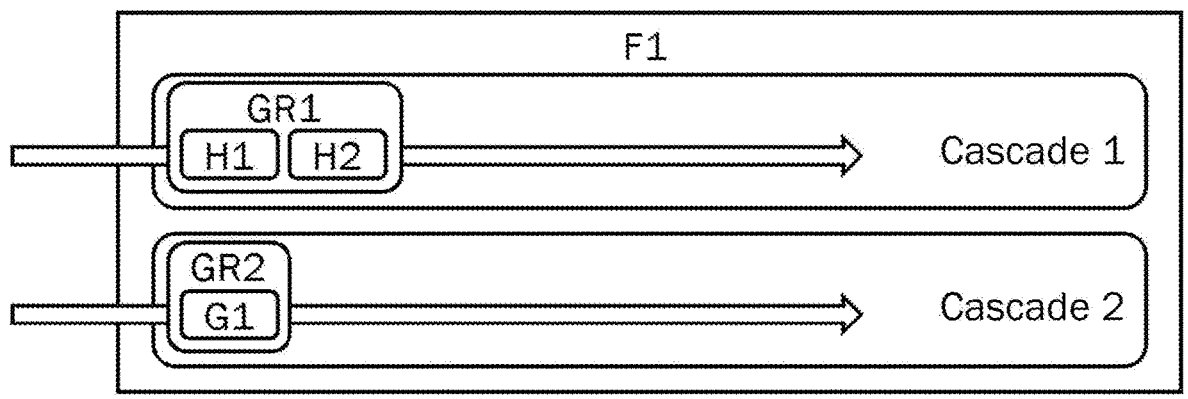
FIG. 6 shows a classification of the energy generators of the fourth embodiment into cascades and groups.

FIG. 6 shows how an sequence of switching on and/or off for the energy generators of the energy supply system of the fourth exemplary embodiment may be determined according to the invention. The wood boilers H1, H2 are combined in a group GR1, so that, as described above, a runtime equalization between the two similar energy generators H1, H2 may take place.

If one were to arrange the gas boiler G1 also in the first cascade 1, namely as the last energy generator, according to the sequential order in the cascade 1 it could be switched on only when the wood boilers H1, H2 are already in operation and the amount of energy required is not sufficient to meet the energy supply request EA. The well-controllable gas boiler G1 could therefore not be used to quickly meet peak loads.

The wood boilers H1, H2 would be switched on and off similarly to the CHPs B1, B2 in the third embodiment. However, here the gas boiler G1 is arranged in a separate cascade 2 and may thus be operated based on a difference between an actual temperature and a target temperature measured at the system flow. Consequently, the gas boiler G1 may be operated independently of the switching state of the wood boilers H1, H2, so that an improved quality of control is achieved. In order to avoid that the wood boilers H1, H2 are operated at unfavorable operating points at low power, although the power of only one wood boilers H1, H2 would be sufficient to cover the required power, this situation may be detected by evaluating the power balance within the group Gr1, A corresponding criterion for switching off the second wood boiler H2 may thereby be defined.

When starting up the energy supply system after a long period of standstill, the control device S recognizes that the energy supply request could be met by only one wood boiler H1. Thus, the second wood boiler H2 is not released by the control device S at all. However, since the wood boiler H1 takes a long time to be heated, the gas boiler G1 is switched on to supply the required amount of heat. As soon as the wood boiler H1 is sufficient to meet the request, the gas boiler G1 is switched off again.

If the value of the required amount of energy drops so far that the flow temperature provided by the wood boiler H1 exceeds the required system flow temperature, the control device may temporarily store the heat supplied in the buffer storage P. If sufficient heat is present in the buffer storage P, then it may be used by the control device S to provide heat like an energy generator, as a result of which, in particular, rapidly occurring power fluctuations may be compensated.

Fifth Embodiment

Figure 7:
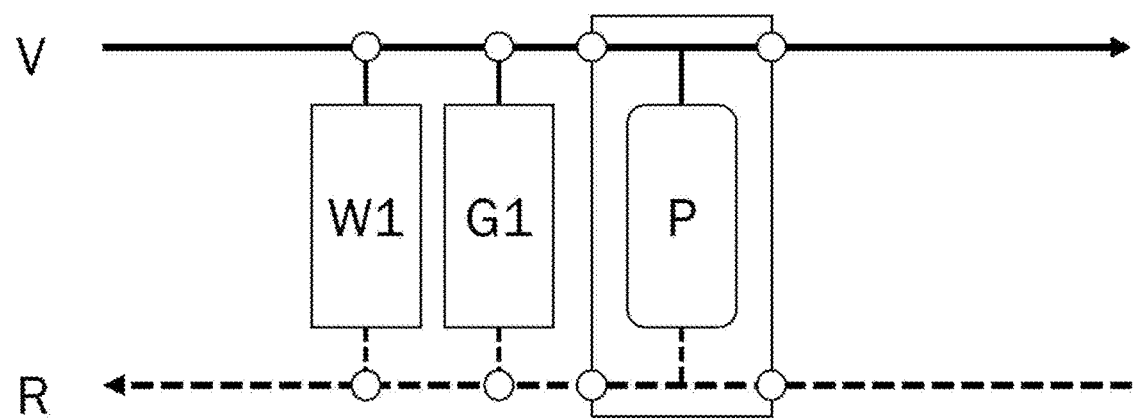
FIG. 7 is a hydraulic diagram of a multivalent energy supply system according to a fifth embodiment including a heat pump and a gas boiler.

FIG. 7 shows a hydraulic diagram of an energy supply system according to a fifth exemplary embodiment. A heat pump W1 and a gas boiler G1 are arranged in parallel to each other and in parallel to a buffer storage P between the flow V and return flow R.

The heat pump W1 should preferably be used to meet a minimum energy request. The gas boiler G1 as a peak load boiler is intended to only to cover the difference to the required amount of heat and thus meet a maximum energy request.

In order for the heat pump W1 to be used first, according to the prior art a fixed (sequential) switch-on and switch-off sequence must be predetermined. However, the heat pump W1 cannot go into operation if return flow temperature is too high. Here, an energy generator specific criterion could be present which requests as a switching state that the heat pump must remain switched off. Due to the fixed switch-on sequence, however, the gas boiler G1 then cannot be put into operation. Thus, the required amount of heat cannot be delivered. This is an example of how an energy generator specific criterion EEK depending on a system parameter (request for a return flow temperature) might prevent the energy generator from switching on, thus blocking the activation of further energy generators in a sequential switching sequence.

The solution to this problem according to the invention will be described with reference to FIG. 8. The heat pump W1 and the gas boiler G1 are each classified into separate cascades 1 and 2. This allows the two energy generators W1, G1 to be switched in parallel and independently of each other. In order for the heat pump W1 to be preferably used, the control device S determines the target value and switching specifications for meeting an energy supply request based on energy generator specific criteria. In the present example, the generator-specific criteria relate to the type of energy generator and its dynamic characteristic. Thus, the control device S detects the restrictions of the energy generators which, for example, force a shutdown of the heat pump W1 at a too high return temperature and specify a certain waiting time between switching operations.

Figure 8:
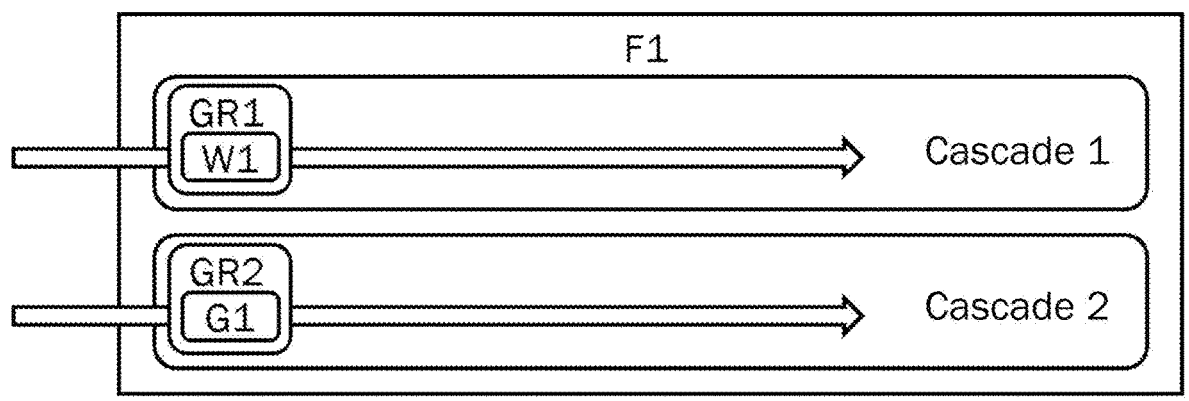
FIG. 8 shows a classification of the energy generators of the fifth embodiment into cascades and groups.

Unlike shown in FIG. 8, the heat pump W1 and the gas boiler G1 could also be placed together in a cascade 1. If W1 would now be switched off when a defined temperature threshold value was exceeded, then the control device S would receive a restriction of W1 that W1 can no longer be switched on for a specific period. As a result, W1 is skipped in the switch-on order and the next energy generator, herein the gas boiler G1, could be switched on if needed.

Sixth Embodiment

Figure 9:
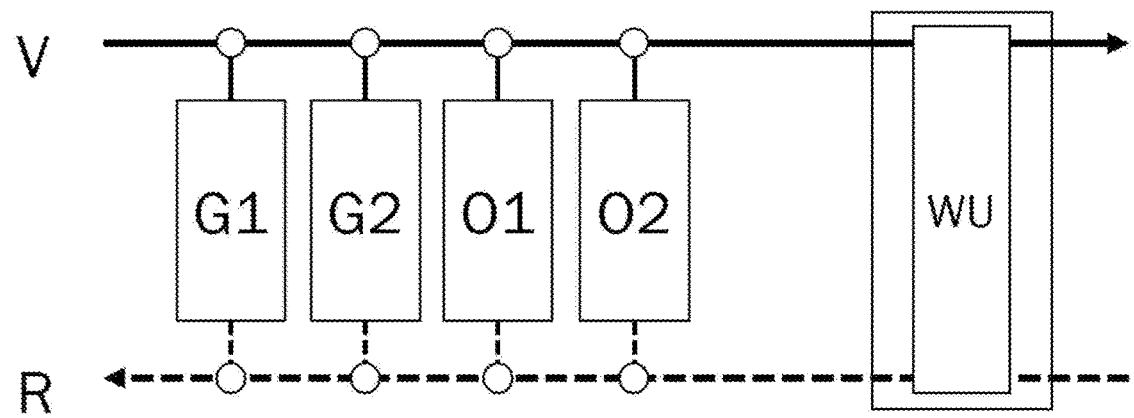
FIG. 9 shows a hydraulic diagram of a multivalent energy supply system according to a sixth exemplary embodiment including two oil boilers and two gas boilers.

In a sixth embodiment, the energy supply system comprises two gas boilers G1, G2 and two oil boilers O1, O2 which are all arranged in parallel to each other between flow V and return flow R. For the transfer of heat into a consumer circuit, heat transfer is provided. A hydraulic diagram of the energy supply system according to the sixth embodiment is shown in FIG. 9.

Figure 10:
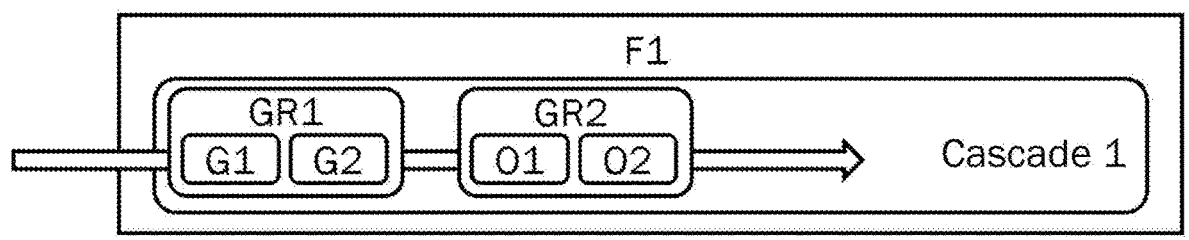
FIG. 10 shows a classification of the energy generators of the sixth embodiment into cascades and groups.

In controlling the energy supply system, the current energy costs and/or the availability of natural gas and heating oil should be taken into account. The energy carrier with the lower energy costs should preferably be used. In addition, runtime equalization should take place between the boilers with the same type of fuel. All boilers may be operated in just one cascade. In order to fulfill the task formulated above, the gas boilers G1, G2 and the oil boilers O1, O2 are each assigned to a separate group as shown in FIG. 10. Within each group, a runtime equalization takes place. Depending on the energy prices, the order of the groups is selected such that the group with the lower heat production costs is switched on first.

Seventh Embodiment

Figure 11:
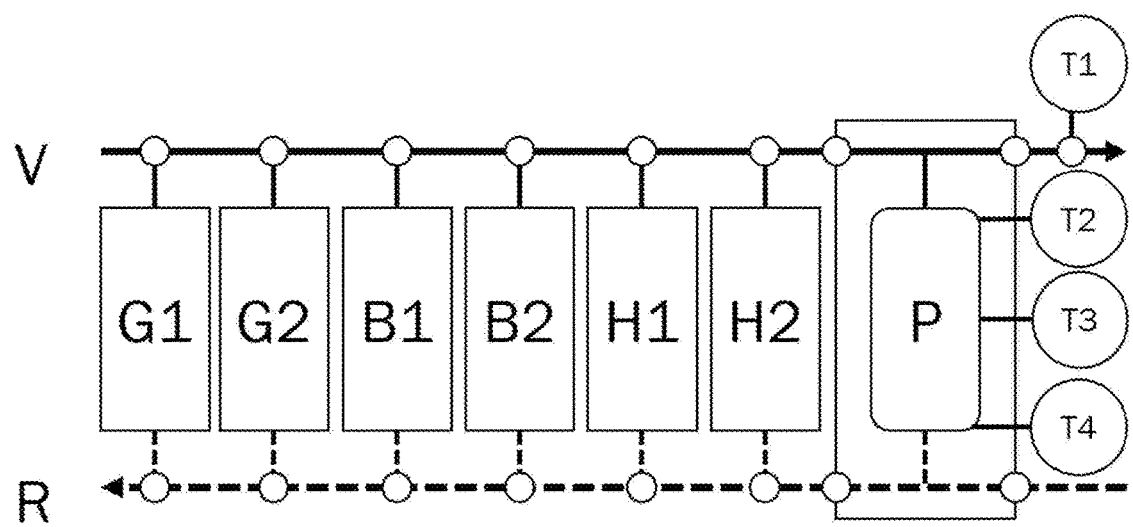
FIG. 11 is a hydraulic diagram of a multivalent energy supply system according to a seventh embodiment including two gas boilers, two CHPs and two wood boilers.

FIG. 11 shows a hydraulic diagram of a multivalent energy supply system according to a seventh exemplary embodiment. The multivalent energy supply system comprises two gas boilers G1, G2 which provide energy in the form of heat, two CHPs B1, B2 which provide energy in the form of heat and electric current, two wood boilers H1, H2 which provide energy in the form of heat, and a buffer storage P. In addition, a temperature sensor T1 is arranged in the flow V which measures the system flow temperature. In the buffer storage P three temperature sensors T2, T3, T4 are arranged, each measuring the temperature in the buffer storage P, respectively in an upper area, in a center area and in a lower area of the buffer storage. The gas boilers G1, G2 use natural gas from a gas supply as an energy carrier, CHPs B1, B2 use diesel from a fuel tank and the wood boilers H1, H2 use wood pellets from a wood pellet store which feeds the wood boilers H1, H2 with fuel via a conveyor means.

Each of the energy generators G1, G2, B1, B2, H1, H2 includes a closed-loop controller for controlling controlled variables of the respective energy generator G1, G2, B1, B2, H1, H2. These controlled variables include, inter alia, a heat output and a volume flow of a fluid carrier medium through the energy generators G1, G2, B1, B2, H1, H2, to which the heat is released. For controlling the volume flow, in the energy generators G1, G2, B1, B2, H1, H2 itself or in the lines (flow V and/or return flow R) connected to the energy generators G1, G2, B1, B2, H1, H2, valves and/or throttles and/or circulating pumps are arranged. In CHPs B1, B2, the controlled variables also include an output electric current or electric voltage.

The control of the energy supply system by a control device S for meeting a detected energy supply request EA which, for example, determines a required system flow temperature at the measuring point T1 or a buffer storage temperature at one of the three measuring points T2, T3, T4 of the buffer storage P, is performed based on the respective energy carriers gas, diesel and wood used by the energy generators G1, G2, B1, B2, H1, H2. Here, wood should be used as a preferred energy carrier. Furthermore, the CHPs B1, B2 should run in continuous operation as much as possible. In order to meet the energy supply request EA, the control device S determines target values SW for each of the energy generators G1, G2, B1, B2, H1, H2 and outputs them to the closed-loop controllers of the energy generators G1, G2, B1, B2, H1, H2. The target values SW may include specifications for controlled variables of the energy generators G1, G2, B1, B2, H1, H2 as well as instructions for switching on and/or switching off the energy generators G1, G2, B1, B2, H1, H2.

The control device S detects an order of switching on and/or off the energy generators G1, G2, B1, B2, H1, H2. The order is determined by means of the classification of the energy generators G1, G2, B1, B2, H1, H2 into groups and cascades shown in FIG. 12. The two similar wood boilers H1, H2 are assigned to a common group GR1. As described above, runtime equalization may take place among the wood boilers H1, H2 in a group. In a corresponding manner, the two CHPs B1, B2 are assigned to the group GR2 and also operated with runtime equalization. The two gas boilers G1 and G2 are assigned to a group GR3. Runtime equalization may also take place among the gas boilers G1, G2.

Figure 12:
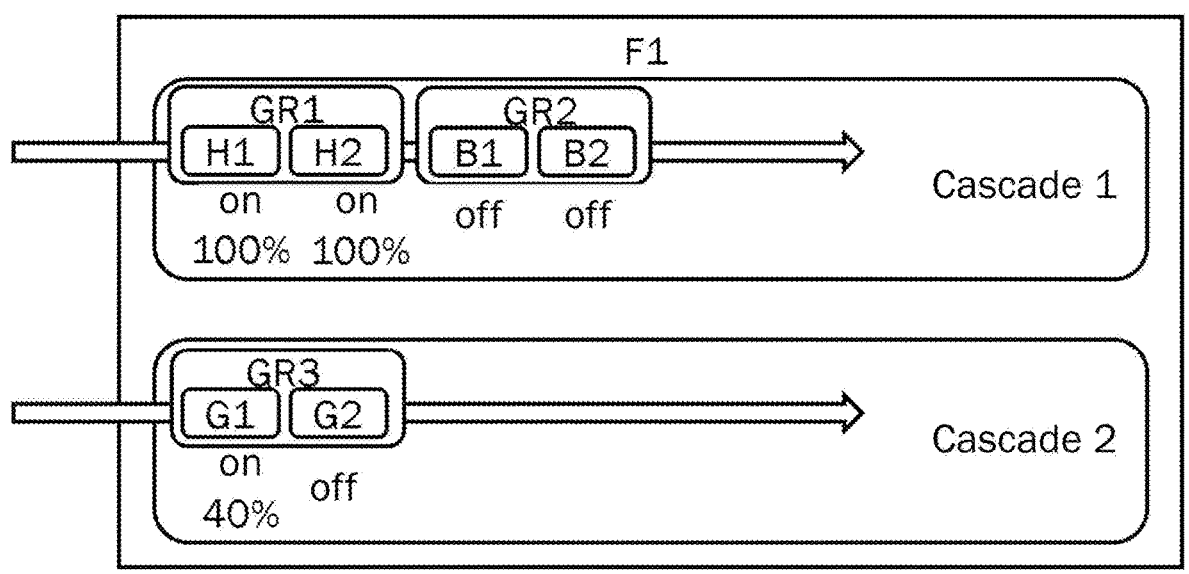
FIG. 12 shows a classification of the energy generators of the seventh embodiment into cascades and groups.

The wood boilers H1, H2 and the CHPs B1, B2 are classified as preferred energy generators, since their operation has advantages over the gas boilers G1, G2 with respect to the availability of the energy carriers used. In addition, electrical energy should be provided as continuously as possible in a first mode. For this purpose, the groups GR1 and GR2 are assigned to a first cascade 1 as shown in FIG. 12. The order of the groups GR1 and GR2 within the group may be based on group-specific criteria. For example, the order may be determined according to current fuel costs, depending on scheduled maintenance measures, or made dependent on an energy supply request for electrical energy. In addition, other specific characteristics of the energy generators may also influence the order of the groups GR1, GR2 in the cascade 1.

In a further operation mode of the multivalent energy supply system, it may be specified to the control device S that the largest possible amount of energy should be stored in the buffer storage P. Here, for the buffer temperature control, a buffer temperature sensor T4 at a lower portion of the buffer storage P is selected. The buffer target temperature is set to, for example, 70° C. The control device S then ensures that the buffer storage P is completely charged to a temperature of 70° C. by operating the energy generators G1, G2, B1, B2, H1, H2 to provide the required amount of heat.

If the buffer storage P is to be loaded only approximately halfway in another mode, a buffer temperature sensor T3 in a center area of the buffer storage P is selected for the buffer temperature control.

In an operation mode in which buffer storage is not desired, a buffer temperature sensor T2 in an upper area of the buffer storage P is selected for the buffer temperature control. It is not necessary to set a buffer target temperature, since an energy generator flow target temperature may be calculated from a system flow target temperature. Only as much energy as is consumed by the consumers is generated, and the buffer storage P is not charged in this case. The system flow temperature may be measured, for example, by a temperature sensor T1 at the flow V.

The power output of wood boilers can be modulated only poorly. The two wood boilers H1, H2 of the embodiment may either be operated at maximum power or be switched off. As described above, the operations of switching on and off are dependent on the supply or consumption of the fuel wood in the combustion chamber and thus relatively time-consuming processes. The wood boilers H1, H2 react only very sluggishly to a change in the controlled variable and can either deliver no power (minimum value) or maximum power (maximum value). Due to these specific characteristics, the wood boilers are classified into the common group GR1.

If at least one of the wood boilers H1, H2 is in operation, it cannot be switched off until the charged fuel is completely burned. The switching state of the wood boiler H1, H2 is then that the wood boiler H1, H2 must be switched on. The closed-loop controller of the wood boiler then notifies the control device S that there is a restriction on the wood boiler H1 or H2 is present as an energy generator specific criterion EEK which specifies that the wood boiler must be switched on or may not be switched off.

If, for example, one of the wood boilers H1, H2 has reached a maximum operating time and to be serviced, the control device S may detect, as an energy generator specific criterion EEK, a corresponding restriction that the wood boiler H1 or H2 must be switched off.

Since the wood boilers H1, H2 are operated as continuously as possible due to their sluggishness, the group GR1 including the wood boilers H1, H2 is particularly well suited for providing a minimum energy request of the energy supply system in the form of heat. Alternatively, the group GR2 including the CHPs B1, B2 may be used to provide a minimum energy request of the energy supply system in the form of heat. The group GR2 may also simultaneously provide a minimum energy request of the energy supply system in the form of electrical energy. The control device S may select one of the two groups GR1 and GR2 for providing the minimum energy request based on the selected operation mode.

The gas boilers G1, G2 which are easily controllable in their power output and react quickly to changes in the controlled variable, are particularly suitable for providing a maximum energy request due to these specific characteristics. In particular, when the amount of heat provided by the wood boilers H1, H2 is insufficient to meet a maximum heat request, the gas boilers G1, G2 are switched on to meet the request.

The control device S of the energy supply system of the seventh embodiment may further include an energy generator detection device 14. This detects which energy forms the energy generators G1, G2, B1, B2, H1, H2 can each provide. If an energy supply request EA for simultaneously providing heat and electrical energy is detected by a request detection device 10, the energy generator detection device 14 determines that the CHPs B1, B2 can provide heat and electrical energy and forwards this information to a target value determination device 11 of the control device S. The target value determination device 11 then determines target values SW for the CHPs B1, B2 for providing heat and electrical energy dependent on the energy supply request EA. A target value output device 12 outputs the target values SW to the closed-loop controllers of the CHPs B1, B2 via a suitable communication interface.

FIG. 12 illustrates the classification of the energy generators of the seventh embodiment into groups and cascades. In addition, an example system state is shown in which the two wood boilers H1, H2 of the first group GR1 are both switched on and operate at full load. The two CHPs B1, B2 of the second group GR2 are switched off. The first gas boiler G1 is switched on and is operated in a modulating manner at a load of 40% of the maximum power.

Eighth Embodiment

Figure 13:
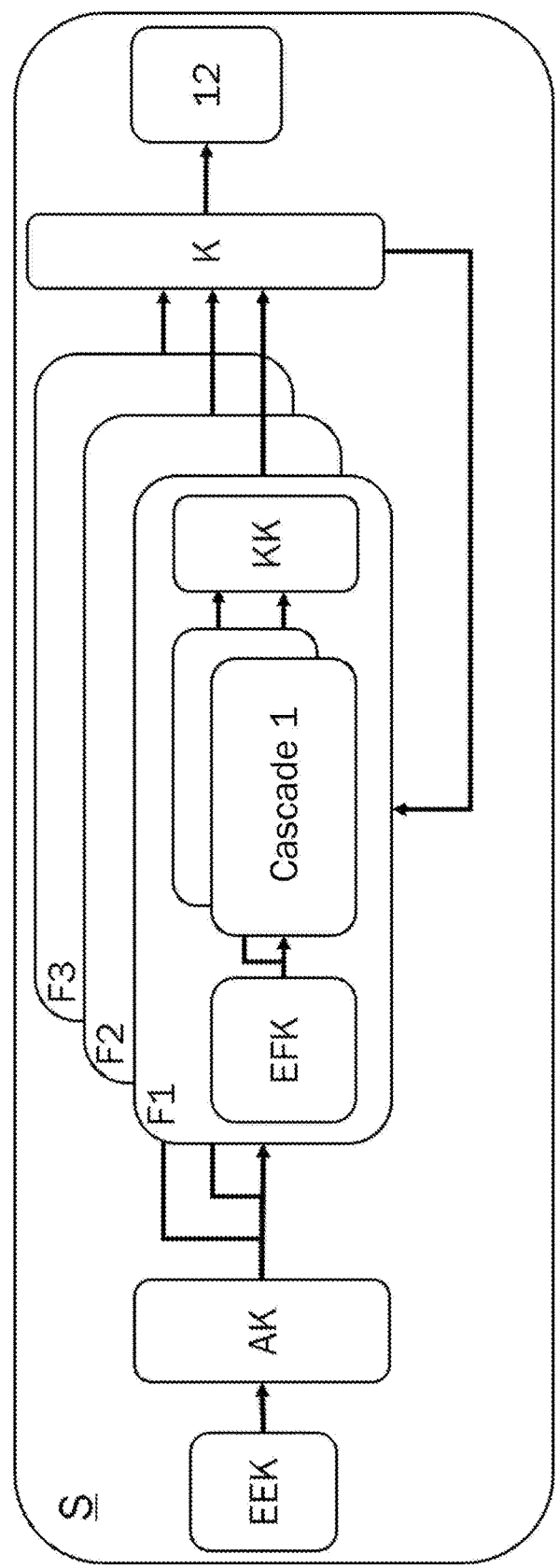
FIG. 13 is a flowchart illustrating how priorities are evaluated in a multivalent energy supply system according to an eighth embodiment

An eighth embodiment is shown in FIG. 13. The flowchart illustrates the order in which criteria of different priority are evaluated by the control device S of a multivalent energy supply system. The large arrow indicates the direction from highest to lowest priority. The multivalent energy supply system may have any number of energy generators.

Each of the energy generators may assume three different switching states: either the energy generator must be switched on, the energy generator must be switched off, or the energy generator may be switched on or off. Which switching state an energy generator assumes is determined by energy generator specific criteria EEK.

In the exemplary embodiment, energy generator-specific criteria EEK have the highest priority. For each of a plurality of energy generators, the control device S detects whether an energy generator specific criterion EEK exists. The result of the detection is one of the three possible switching states mentioned above. For example, a minimum runtime can be specified to an energy generator. The minimum runtime can prevent the energy generator from being switched off before the minimum runtime has expired. The minimum runtime starts after switching on the energy generator. The energy generator may also be given a minimum down time which may prevent the energy generator from being switched on before the minimum down time has expired. The minimum down time begins after the energy generator is switched off. Accordingly, further energy generator specific criteria EEK for an energy generator may be defined which can prevent switching on or off.

In addition, an energy generator specific criterion EEK may also specify minimum or maximum target value limits. For example, an energy generator-specific criterion EEK may specify a maximum volume flow of a carrier medium through the energy generator and/or a maximum power. This can prevented, for example, that the energy generator is operated with too high a power, for example, to prevent high wear of the energy generator and/or to operate the energy generator as efficiently as possible.

Since the energy generator-specific criteria EEK should have the highest priority, the control device S cannot change these criteria. The control device S must accept the criteria unchanged. This hierarchy may serve to protect the energy generators.

The second highest position in the order of the criteria is taken by system specific criteria AK. These criteria may be defined globally for the entire energy supply system and be independent of energy forms. For example, a minimum buffer temperature may be set, below which the buffer temperature may not fall. As a result, a buffer frost protection may be ensured.

Another example of a system specific criterion AK is a maximum buffer temperature. By specifying a maximum buffer temperature, for example, the total energy consumption of the energy supply system may be optimized.

In order to ensure system frost protection, a minimum system flow temperature may also be specified. The system flow temperature may be defined for one or more specific measuring point(s) in the flow of the energy supply system. The minimum system flow temperature may also be determined dependent on an outside temperature, as system frost protection may only be necessary if the temperature falls below a certain outside temperature. Furthermore, the system frost protection may only be activated in certain seasons.

In addition, a maximum system flow temperature may also be set. Accordingly, minimum and maximum system values for electrical energy and/or cold may also be specified. By specifying system specific criteria, an emergency operation of the energy supply system may be realized. In an emergency operation, the energy generators may be operated independently, only controlled by the closed-loop controllers.

In the case of an emergency stop, for example when a pipe breakage has been detected and/or when an emergency stop switch is actuated, requirements for valves and/or pumps in the energy supply system may be output in addition to switch-off requests to all energy generators, so that certain valves are closed and/or certain pumps are switched off.

For each energy form F1-F3, criteria may be defined in parallel which are taken into account independently of each other. Within each energy form F1-F3, criteria may be defined in a hierarchical order. In the first position of the order of priority within an energy form F1-F3, energy form specific generator criteria EFK may be defined.

Energy form specific generator criteria EFK may be set, for example, season-dependently. For example, in the summer, the energy form of heat may be switched off completely, or only the supply of hot water to certain consumers may be set. Accordingly in winter, an increased consumption of heat may be taken into account. Similarly, season-dependent specifications may be set for the energy form of cold. Furthermore, depending on an outside temperature, certain energy generators of an energy form may be locked, if this is permissible in accordance with energy generator specific criteria EEK.

The energy generators of an energy form F1-F3 may be classified into cascades controllable in parallel and independently of each other. Accordingly, criteria may be defined which are evaluated per cascade. Such cascade criteria may, for example, predetermine switch-on integrals and/or switch-off integrals. In this way, for example, an energy generator, when performing runtime equalization with another energy generator, is prevented from immediately switching off after swapping the switching order in order to prevent a controlled variable from falling below a predetermined target value. The energy generator which shifts to a rear position within the respective switching sequence order due to the runtime equalization, may remain switched on until the actual value of the corresponding controlled variable rises above a threshold value after a certain time.

Within an energy form F1-F3, a cascade coordinator KK may ensure that the requests from the individual cascades are combined. Thus, criteria within an energy form may be coordinated so that no conflicting switching requests or target value inputs are output to the energy generators within an energy form F1-F3.

In the next position, the coordinating unit K coordinates the respective criteria or switching requests and target value specifications from the three energy forms F1-F3. Here, the coordinating unit K may solve conflicts between the switching requests and target value specifications from the three energy forms F1-F3 in accordance with a prioritization of the energy forms F1-F3.

According to the order of priorities described in this embodiment, the control device S may determine which energy generators are available to meet an energy supply request EA. Furthermore, restrictions on individual energy generators or energy forms F1-F3 with different priorities may be taken into account. By specifying the criteria, a plurality of operating modes and/or operating states of a multivalent energy supply system may be determined based on a plurality of operating parameters, energy supply requests EA and/or external conditions. The method according to the invention may thus enable a particularly safe and efficient operation of a multivalent energy supply system The features disclosed in the foregoing description, the claims and the drawings may be of importance for the realization of the invention in its various forms both individually and in any combination.

LIST OF REFERENCE SYMBOLS 10 request detection device
11 target value determination device
12 target value output device 13 device for detecting restrictions
14 criteria determination device
V flow
R return flow
S control device
S1 first control unit
S2 second control unit
S3 third control unit
K coordinating unit
P buffer storage
R1 first closed-loop controller
R2 second closed-loop controller
R3 third closed-loop controller
R4 fourth closed-loop controller
R5 fifth closed-loop controller
E1 first energy generator
E2 second energy generator
E3 third energy generator
E4 fourth energy generator
E5 fifth energy generator
G1 first gas boiler
G2 second gas boiler
O1 first oil boiler
O2 second oil boiler
B1 first CHP
B2 second CHP
H1 first wood boiler
H2 second wood boiler
W1 heat pump
GR1 first group
GR2 second group
GR3 third group
F1 first energy form (heat)
F2 second energy form (electrical energy)
F3 third energy form (cold)
EEK energy generator specific criteria
AK system specific criteria
EFK energy form specific generator criteria
KK cascade coordinator

The invention claimed is:

1. A method of controlling a multivalent energy supply system, wherein the energy supply system comprises at least:
at least two energy generators (E1-E5, B1, B2, G1, G2, H1, H2, O1, O2, W1) which use at least two different energy carriers to provide at least two energy forms selected from the group consisting of heat, cold and electrical energy;
for each energy generator, a closed-loop controller (R1-R5) for controlling controlled variables of the energy generator (E1-E5, B1, B2, G1, G2, H1, H2, O1, O2, W1); and
wherein each energy generator (E1-E5, B1, B2, G1, G2, H1, H2, O1, O2, W1) can assume three possible switching states: the energy generator (E1-E5, B1, B2, G1, G2, H1, H2, O1, O2, W1) must be switched on, the energy generator (E1-E5, B1, B2, G1, G2, H1, H2, O1, O2, W1) must be switched off, the energy generator (E1-E5, B1, B2, G1, G2, H1, H2, O1, O2, W1) may be switched on or off;
a control device (S) for coordinatedly controlling the closed-loop controllers (R1-R5), wherein the control device (S) carries out the following method steps:
detecting at least one energy supply request (EA) for at least two energy forms selected from the group consisting of heat, cold and electrical energy;
for each of the energy generators (E1-E5, B1, B2, G1, G2, H1, H2, O1, O2, W1), determining whether there is an energy generator specific criterion (EEK) which specifies exactly one of the three possible switching states for the energy generator (E1-E5, B1, B2, G1, G2, H1, H2, O1, O2, W1);
determining whether there is more than one energy supply request (EA) for an energy generator (E1-E5, B1, B2, G1, G2, H1, H2, O1, O2, W1);
if there is more than one energy supply request (EA) for an energy generator (E1-E5, B1, B2, G1, G2, H1, H2, O1, O2, W1): determining which of the energy supply requests (EA) should be treated as a priority;
for each energy generator (E1-E5, B1, B2, G1, G2, H1, H2, O1, O2, W1), determining target values (SW) for meeting the at least one energy supply request (EA) based on the energy supply request which is treated as a priority (EA) and the energy generator specific criterion (EEK); and
outputting the target values (SW) to the closed-loop controllers (R1-R5).

2. The method according to claim 1, wherein the control device (S) further detects an order of switching on and/or off the energy generators (E1-E5, B1, B2, G1, G2, H1, H2, O1, O2, W1), and wherein determining the target values (SW) is performed depending on the order.

3. The method according to claim 1, wherein at least one energy generator (E1-E5, B1, B2, G1, G2, H1, H2, O1, O2, W1) is used to meet a minimum energy request.

4. The method according to claim 1, wherein at least one energy generator (E1-E5, B1, B2, G1, G2, H1, H2, O1, O2, W1) is used to meet a maximum energy request.

5. The method according to claim 1, wherein the control device (S) further carries out the steps of:
detecting, from each of the closed-loop controllers (R1-R5), restrictions on the controlled variables of the respective energy generator (E1-E5, B1, B2, G1, G2, H1, H2, O1, O2, W1) from each of the closed-loop controllers (R1-R5), wherein the restrictions relate to minimum and/or maximum values of a power provided by the energy generator (E1-E5, B1, B2, G1, G2, H1, H2, O1, O2, W1) and/or indicate whether the respective energy generator (E1-E5, B1, B2, G1, G2, H1, H2, O1, O2, W1) must be switched on or off;
detecting, from each of the closed-loop controllers (R1-R5), specific characteristics regarding a power output of the respective energy generator (E1-E5, B1, B2, G1, G2, H1, H2, O1, O2, W1) which indicate how an energy generator (E1-E5, B1, B2, G1, G2, H1, H2, O1, O2, W1) responds to a change in controlled variables;
determining an order of switching on and/or switching off the energy generators (E1-E5, B1, B2, G1, G2, H1, H2, O1, O2, W1) based on the restrictions and/or the specific characteristics of the energy generators (E1-E5, B1, B2, G1, G2, H1, H2, O1, O2, W1);
determining target values for each energy generator (E1-E5, B1, B2, G1, G2, H1, H2, O1, O2, W1) for meeting the at least one energy supply request (EA) depending on the order of switching on and/or off.

6. The method according to claim 1, wherein the control device (S) further carries out the steps of:
detecting whether there is an energy supply request (EA) for providing heat and electrical energy;
determining whether one of the energy generators (E1-E5, B1, B2, G1, G2, H1, H2, O1, O2, W1) can provide heat and electrical energy;

determining target values (SW) for the energy generator (E1-E5, B1, B2, G1, G2, H1, H2, O1, O2, W1) for providing heat and electrical energy based on the at least one energy supply request (EA).

7. A control device (S) for controlling a multivalent energy supply system, wherein the multivalent energy supply system comprises at least:

at least two energy generators (E1-E5, B1, B2, G1, G2, H1, H2, O1, O2, W1) which use at least two different energy carriers to provide at least two energy forms selected from the group consisting of heat, cold and electrical energy; and for each energy generator (E1-E5, B1, B2, G1, G2, H1, H2, O1, O2, W1), a closed-loop controller (R1-R5) for controlling controlled variables of the energy generator;

wherein each energy generator (E1-E5, B1, B2, G1, G2, H1, H2, O1, O2, W1) can assume three possible switching states: the energy generator (E1-E5, B1, B2, G1, G2, H1, H2, O1, O2, W1) must be switched on, the energy generator (E1-E5, B1, B2, G1, G2, H1, H2, O1, O2, W1) must be switched off, the energy generator (E1-E5, B1, B2, G1, G2, H1, H2, O1, O2, W1) may be switched on or off;

wherein the control device (S) comprises:

a request detection device (10) for detecting at least one energy supply request (EA) for at least two energy forms (F1-F3) selected from the group consisting of heat, cold and electrical energy;

a criteria determination device (14) configured to determine, for each of the energy generators (E1-E5, B1, B2, G1, G2, H1, H2, O1, O2, W1), whether there is an energy generator specific criterion (EEK) which specifies exactly one of the three possible switching states for the energy generator (E1-E5, B1, B2, G1, G2, H1, H2, O1, O2, W1);

a target value determination device (11) configured to determine, for each energy generator (E1-E5, B1, B2, G1, G2, H1, H2, O1, O2, W1), target values (SW) for meeting the energy supply request (EA) based on the energy generator specific criterion (EEK):

a target value output device (12) for outputting the target values (SW) to the closed-loop controllers (R1-R5); and a coordinating unit (K) configured to output switching requests and/or target value specifications from the energy forms (F1-F3) heat, cold, and electrical energy to the target value output device (12) according to a prioritization of the energy forms (F1-F3) heat, cold, and electrical energy.

8. The control device (S) according to claim 7, wherein the control device (S) further comprises a device (13) for detecting restrictions, wherein the restrictions relate to minimum and/or maximum values of power provided by an energy generator (E1-E5, B1, B2, G1, G2, H1, H2, O1, O2, W1).

* * * * *